United States Patent
Yu et al.

(10) Patent No.: US 10,085,258 B2
(45) Date of Patent: Sep. 25, 2018

(54) FRAME TRANSMITTING METHOD AND FRAME RECEIVING METHOD

(71) Applicant: NEWRACOM, INC., Irvine, CA (US)

(72) Inventors: Heejung Yu, Daegu (KR); Minho Cheong, Irvine, CA (US); Hyoungjin Kwon, Daejeon (KR)

(73) Assignee: NEWRACOM, INC., Lake Forest, CA (US)

( * ) Notice: Subject to any disclaimer, the term of this patent is extended or adjusted under 35 U.S.C. 154(b) by 178 days.

(21) Appl. No.: 14/790,809

(22) Filed: Jul. 2, 2015

(65) Prior Publication Data
US 2016/0014725 A1 Jan. 14, 2016

(30) Foreign Application Priority Data

Jul. 4, 2014 (KR) .................. 10-2014-0083751
Oct. 10, 2014 (KR) .................. 10-2014-0136898

(51) Int. Cl.
*H04W 72/04* (2009.01)
*H04W 84/12* (2009.01)

(52) U.S. Cl.
CPC ........ *H04W 72/0453* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 7,920,885 B2* | 4/2011 | Singh | .................. | H04W 76/023 370/332 |
| 8,498,275 B2* | 7/2013 | Wentink | .............. | H04W 74/008 370/336 |
| 8,670,399 B2* | 3/2014 | Liu | .......................... | H04L 5/001 370/329 |
| 8,730,905 B2* | 5/2014 | Kneckt | ............. | H04W 72/0406 370/330 |
| 8,767,570 B2* | 7/2014 | Ong | .................. | H04W 74/0816 370/252 |
| 8,767,692 B2* | 7/2014 | Kim | .................... | H04W 76/023 370/328 |
| 8,902,829 B2* | 12/2014 | Stephens | ............... | H04W 16/14 370/252 |
| 9,203,586 B2* | 12/2015 | You | .......................... | H04B 7/04 |
| 9,204,337 B2* | 12/2015 | Fischer | ................ | H04L 5/0007 |
| 9,215,055 B2* | 12/2015 | Chu | ........................ | H04L 5/0037 |
| 9,332,493 B2* | 5/2016 | Seok | .................. | H04W 52/0216 |
| 9,338,660 B2* | 5/2016 | Cheong | ................ | H04W 16/26 |
| 9,338,789 B2* | 5/2016 | Wang | ................ | H04W 72/0413 |
| 9,374,736 B2* | 6/2016 | Cheong | ................ | H04W 28/16 |
| 9,379,858 B2* | 6/2016 | Erceg | ................... | H04L 5/0023 |
| 9,402,240 B2* | 7/2016 | Seok | .................... | H04W 52/367 |
| 9,408,230 B2* | 8/2016 | Zhu | | |
| 9,456,456 B2* | 9/2016 | Seok | .................... | H04W 74/006 |

(Continued)

*Primary Examiner* — Gregory B Sefcheck

(57) ABSTRACT

A method of transmitting a frame is provided by a first device in a WLAN. The first device transmits a first frame including bandwidth information of a first channel to a second device and performs a communication with the second device through the first channel. The first channel is selected from among a plurality of channels into which an entire channel width is divided. Discontinuous channels are capable of being selected as the first channel from among the plurality of channels.

20 Claims, 25 Drawing Sheets

(56) References Cited

U.S. PATENT DOCUMENTS

| | | | | |
|---|---|---|---|---|
| 9,497,057 B2* | 11/2016 | You | | H04L 25/0204 |
| 9,503,976 B2* | 11/2016 | Seok | | H04W 74/04 |
| 9,525,474 B2* | 12/2016 | Park | | H04L 25/0226 |
| 9,538,368 B2* | 1/2017 | Seok | | H04W 74/04 |
| 9,577,744 B2* | 2/2017 | Seok | | H04W 56/00 |
| 9,629,078 B2* | 4/2017 | Seok | | H04W 52/0206 |
| 9,681,462 B2* | 6/2017 | Wang | | H04W 72/0413 |
| 9,699,730 B2* | 7/2017 | Seok | | H04W 52/0216 |
| 9,699,734 B2* | 7/2017 | Seok | | H04W 52/0229 |
| 9,723,611 B2* | 8/2017 | Seok | | H04W 72/0446 |
| 9,756,612 B2* | 9/2017 | Park | | H04W 72/02 |
| 9,807,759 B2* | 10/2017 | Roh | | H04W 72/042 |
| 9,860,713 B2* | 1/2018 | Seok | | H04W 4/06 |
| 2012/0051350 A1* | 3/2012 | Kim | | H04W 76/023 |
| | | | | 370/338 |
| 2014/0079016 A1* | 3/2014 | Dai | | H04L 5/0041 |
| | | | | 370/330 |
| 2014/0086200 A1* | 3/2014 | Seok | | H04W 72/02 |
| | | | | 370/330 |
| 2014/0192777 A1* | 7/2014 | Seok | | H04W 36/06 |
| | | | | 370/331 |
| 2015/0296454 A1* | 10/2015 | Lee | | H04W 52/0209 |
| | | | | 370/311 |
| 2015/0296517 A1* | 10/2015 | Yu | | H04L 25/03866 |
| | | | | 370/338 |
| 2016/0014725 A1* | 1/2016 | Yu | | H04W 72/0453 |
| | | | | 370/329 |
| 2016/0128057 A1* | 5/2016 | Seok | | H04L 5/0055 |
| | | | | 370/329 |
| 2016/0164654 A1* | 6/2016 | Huang | | H04B 7/0452 |
| | | | | 370/392 |
| 2016/0174200 A1* | 6/2016 | Seok | | H04W 72/04 |
| | | | | 370/329 |
| 2016/0174254 A1* | 6/2016 | Hedayat | | H04W 74/006 |
| | | | | 370/329 |
| 2016/0219130 A1* | 7/2016 | Ghosh | | H04L 69/22 |
| 2016/0242177 A1* | 8/2016 | Seok | | H04W 72/0446 |
| 2016/0249397 A1* | 8/2016 | Seok | | H04W 76/023 |
| 2016/0286551 A1* | 9/2016 | Lee | | H04L 27/26 |
| 2016/0315675 A1* | 10/2016 | Seok | | H04B 7/0452 |
| 2016/0315681 A1* | 10/2016 | Moon | | H04B 7/0621 |
| 2016/0323426 A1* | 11/2016 | Hedayat | | H04L 69/324 |
| 2016/0359538 A1* | 12/2016 | Onggosanusi | | H04B 7/0469 |
| 2016/0360528 A1* | 12/2016 | Kim | | H04W 74/0816 |

* cited by examiner

FIG. 12

| SC idx | Object |
|---|---|
| -32 | Guard |
| -31 | Guard |
| -30 | Guard |
| -29 | Guard |
| -28 | Guard |
| -27 | Guard |
| -26 | |
| -25 | |
| -24 | |
| -23 | |
| -22 | |
| -21 | Pilot |
| -20 | |
| -19 | |
| -18 | |
| -17 | |
| -16 | |
| -15 | |
| -14 | |
| -13 | |
| -12 | |
| -11 | |
| -10 | |
| -9 | |
| -8 | |
| -7 | Pilot |
| -6 | |
| -5 | |
| -4 | |
| -3 | |
| -2 | |
| -1 | |

| SC idx | Object |
|---|---|
| 0 | DC |
| 1 | |
| 2 | |
| 3 | |
| 4 | |
| 5 | |
| 6 | |
| 7 | Pilot |
| 8 | |
| 9 | |
| 10 | |
| 11 | |
| 12 | |
| 13 | |
| 14 | |
| 15 | |
| 16 | |
| 17 | |
| 18 | |
| 19 | |
| 20 | |
| 21 | Pilot |
| 22 | |
| 23 | |
| 24 | |
| 25 | |
| 26 | |
| 27 | Guard |
| 28 | Guard |
| 29 | Guard |
| 30 | Guard |
| 31 | Guard |

FIG. 13

| SC idx | Object |
|---|---|
| -32 | Guard |
| -31 | Guard |
| -30 | Guard |
| -29 | Guard |
| -28 | |
| -27 | |
| -26 | |
| -25 | |
| -24 | |
| -23 | |
| -22 | |
| -21 | Pilot |
| -20 | |
| -19 | |
| -18 | |
| -17 | |
| -16 | |
| -15 | |
| -14 | |
| -13 | |
| -12 | |
| -11 | |
| -10 | |
| -9 | |
| -8 | |
| -7 | Pilot |
| -6 | |
| -5 | |
| -4 | |
| -3 | |
| -2 | |
| -1 | |

| SC idx | Object |
|---|---|
| 0 | DC |
| 1 | |
| 2 | |
| 3 | |
| 4 | |
| 5 | |
| 6 | |
| 7 | Pilot |
| 8 | |
| 9 | |
| 10 | |
| 11 | |
| 12 | |
| 13 | |
| 14 | |
| 15 | |
| 16 | |
| 17 | |
| 18 | |
| 19 | |
| 20 | |
| 21 | Pilot |
| 22 | |
| 23 | |
| 24 | |
| 25 | |
| 26 | |
| 27 | |
| 28 | |
| 29 | Guard |
| 30 | Guard |
| 31 | Guard |

FRAME TRANSMITTING METHOD AND FRAME RECEIVING METHOD

CROSS-REFERENCE TO RELATED APPLICATION

This application claims priority to and the benefit of Korean Patent Application Nos. 10-2014-0083751 and 10-2014-0136898, filed on Jul. 4, 2014 and Oct. 10, 2014 in the Korean Intellectual Property Office, the entire contents of which are incorporated herein by reference.

BACKGROUND (a) Field

The described technology relates generally to a frame transmitting method and a frame receiving method. More particularly, the described technology relates generally to a frame transmitting method and a frame receiving method in a wireless local area network (WLAN).

(b) Description of the Related Art

A frequency band used in the WLAN is an unlicensed band, and other wireless devices, for example Bluetooth devices, besides WLAN devices can use the same frequency band. Therefore, the WLAN devices use a carrier sense multiple access (CSMA) protocol to avoid collisions with the other WLAN devices or the other wireless devices. In the CSMA protocol, the WLAN device detects energy on a channel and transmits the signal only when the channel is not being used. In this case, the WLAN device occupies the channel by transmitting a request to send (RTS) frame or a clear to send (CTS) frame. The other devices set a network allocation vector (NAV) based on a duration field of the RTS frame or CTS frame and do not perform the contention for a channel access during the NAV duration.

A current WLAN can a wide bandwidth by using a primary channel together with a second channel. For example, the IEEE standard 802.11ac may use bandwidths such as 20 MHz, 40 MHz, 80 MHz, and 160 MHz through a secondary channel of 20 MHz, a secondary channel of 40 MHz, and a secondary channel of 80 MHz as well as the primary channel of 20 MHz. However, the secondary channel should be always used together with the primary channel. Accordingly, even if the other device uses some bands including the primary channel, unoccupied channels cannot be used.

On the other hand, a basic service set (BSS) operating on the same channel as a device's BSS and within (either partly or wholly) its basic service area (BSA) may exist in the WLAN. This BSS is called an overlapping basic service set (OBSS). In the high density WLAN environment, if the OBSS uses the primary channel, unoccupied secondary channels cannot be used because of the NAV set by the OBSS.

As such, the current WLAN cannot efficiently use the channels.

SUMMARY

Embodiments of the present invention provide a frame transmitting method and a frame receiving method for efficiently using channels.

According to another embodiment of the present invention, a method of transmitting a frame is provided by a first device in a WLAN. The method includes transmitting a first frame including bandwidth information of a first channel to a second device and performing a communication with the second device through the first channel. The first channel is selected from among a plurality of channels into which an entire channel width is divided. Discontinuous channels are capable of being selected as the first channel from among the plurality of channels.

The method may further include receiving a second frame including bandwidth information of a second channel from the second device before transmitting the first frame, the second channel being selected from among the plurality of channels. Transmitting the first frame may include selecting the first channel from the second channel.

Receiving the second frame may include receiving the second frame on the plurality of channels.

Receiving the second frame may include receiving the second frame only on the second channel.

Transmitting the first frame may include transmitting the first frame on the plurality of channels.

Transmitting the first frame may include transmitting the first frame only on the first channel.

A transmission may be performed through a second channel between a third device and a fourth device when the first frame is transmitted, and the second channel may be a part of the plurality of channels and may not include the first channel.

The method may further include matching an end time of a transmission through the first channel to an end time of a transmission through the second channel.

The method may further include, when a transmission through the second channel ends and a new transmission through the second channel starts while a transmission through the first channel is performed, aligning an end time of the transmission through the first channel to match the end time of the transmission through the first channel to an end time of the new transmission through the second channel.

The method may further include setting a first NAV by a transmission through the first channel at a third device after the communication with the second device is completed and setting a second NAV by a transmission through a second channel that is a part of the plurality of channels and does not include the first channel.

The method may further include, when any one of the first NAV and the second NAV is expired, acquiring a transmission opportunity (TXOP) through a channel of the expired NAV, and aligning TXOP duration of a transmission through the channel of the expired NAV with TXOP duration of a channel of unexpired NAV. The first frame may include a legacy short training field, a legacy long training field, a legacy signal field, and a data field of a legacy frame format. The bandwidth information may be allocated to additional data subcarriers that are some of subcarriers which are not set as data subcarriers at the legacy frame format, in at least one field of the legacy short training field, the legacy long training field, the legacy signal field, and the data field.

The at least one field may include the data field.

The at least one field may further include the legacy signal field.

According to yet another embodiment of the present invention, a method of receiving a frame is provided by a first device in a WLAN. The method includes receiving a first frame including bandwidth information of a first channel from a second device and performing a communication with the second device through the first channel. The first channel is selected from among a plurality of channels into which an entire channel width is divided. Discontinuous channels are capable of being selected as the first channel from among the plurality of channels.

The method may further include transmitting a second frame including bandwidth information of a second channel to the second device before receiving the first frame, the second channel being selected from among the plurality of channels. The first channel may be selected from the second channel.

Transmitting the second frame may include transmitting the second frame on the plurality of channels.

Transmitting the second frame may include transmitting the second frame only on the second channel.

Receiving the first frame may include receiving the first frame on the plurality of channels.

Receiving the first frame may include receiving the first frame only on the first channel.

According to still another embodiment of the present invention, a frame transmitting apparatus of a first device is provided in a WLAN. The frame transmitting apparatus includes a processor and a transceiver. The transceiver transmits to a second device a first frame including bandwidth information of a first channel that is selected from among a plurality of channels into which an entire channel width is divided. The processor is capable of selecting discontinuous channels as the first channel from among the plurality of channels, and performs a communication with the second device through the first channel.

According to further embodiment of the present invention, a frame receiving apparatus of a first device is provided in a WLAN. The frame transmitting apparatus includes a processor and a transceiver. The transceiver receives from a second device a first frame including bandwidth information of a first channel that is selected from among a plurality of channels into which an entire channel width is divided. Discontinuous channels are capable of being selected as the first channel from among the plurality of channels. The processor performs a communication with the second device through the first channel

BRIEF DESCRIPTION OF THE DRAWINGS

FIG. 12 shows an example of a subcarrier allocation in a 20 MHz transmission mode of a previous WLAN.

FIG. 13 shows an example of a subcarrier allocation in a wireless communication network according to an embodiment of the present invention.

DETAILED DESCRIPTION OF THE EMBODIMENTS

Figure 1:
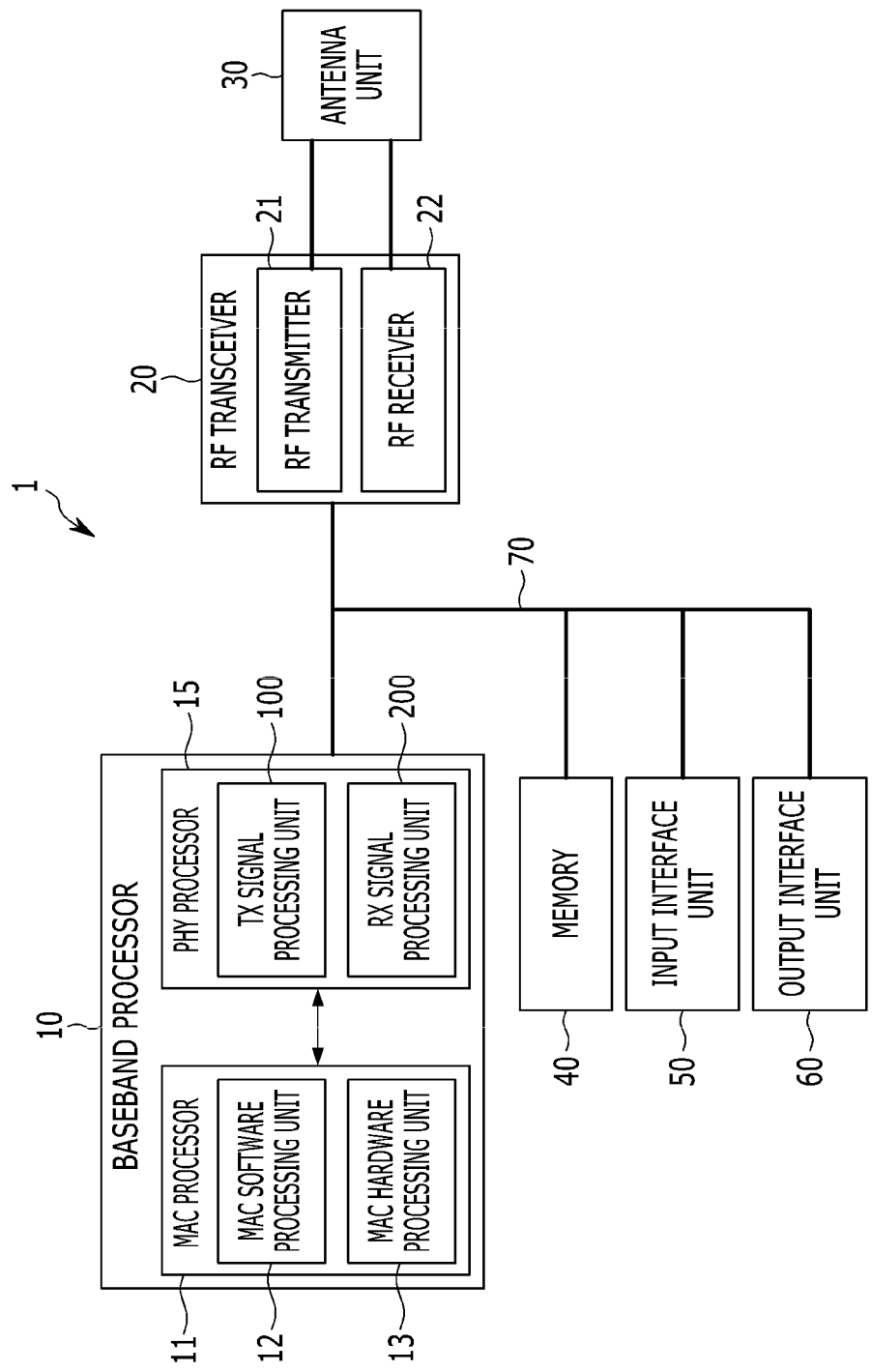
FIG. 1 is a schematic block diagram exemplifying a WLAN device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to the IEEE (Institute of Electrical and Electronics Engineers) standard 802.11. The plurality of WLAN devices may include a WLAN device that is an access point and the other WLAN devices that are non-AP stations (non-AP STAs). Alternatively, all the plurality of WLAN devices may be non-AP STAs in Ad-hoc networking. In general, the AP STA and the non-AP STA may be collectively called the STA. However, for easy description, only the non-AP STA may be called the STA.

FIG. 1 is a schematic block diagram exemplifying a WLAN device.

Referring to FIG. 1, the WLAN device 1 includes a baseband processor 10, a radio frequency (RF) transceiver 20, an antenna unit 30, a memory 40, an input interface unit 50, an output interface unit 60, and a bus 70.

The baseband processor 10 performs baseband signal processing, and includes a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to "MAC hardware"). However, the MAC processor 11 is not limited to this.

The PHY processor 15 includes a transmitting signal processing unit 100 and a receiving signal processing unit 200.

The baseband processor 10, the memory 40, the input interface unit 50, and the output interface unit 60 may communicate with each other via the bus 70.

The RF transceiver 20 includes an RF transmitter 21 and an RF receiver 22.

The memory 40 may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
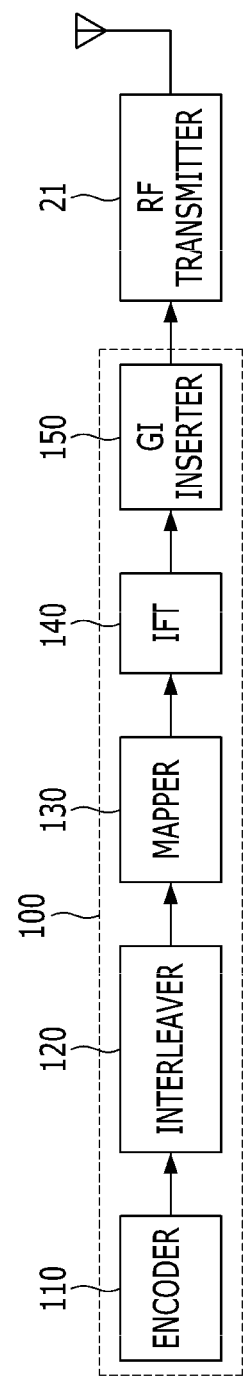
FIG. 2 is a schematic block diagram exemplifying a transmitting signal processor in a WLAN.

FIG. 2 is a schematic block diagram exemplifying a transmitting signal processor in a WLAN.

Referring to FIG. 2, a transmitting signal processing unit 100 includes an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers corresponding to the number of $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
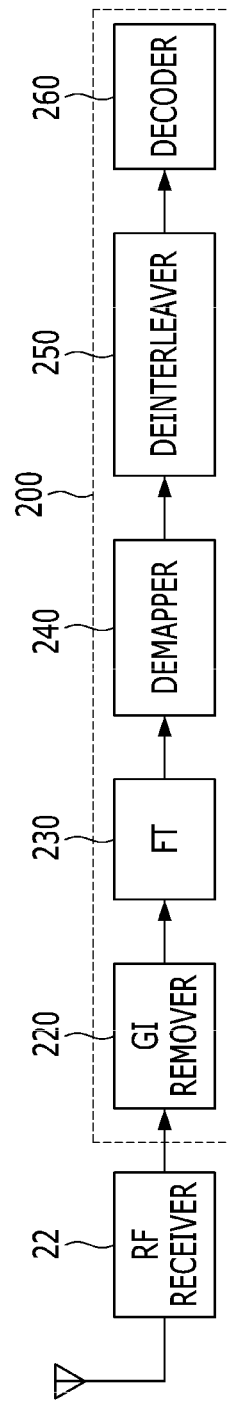
FIG. 3 is a schematic block diagram exemplifying a receiving signal processing unit in the WLAN.

FIG. 3 is a schematic block diagram exemplifying a receiving signal processing unit in the WLAN.

Referring to FIG. 3, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into the symbols. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain.

When the MIMO or the MU-MIMO is used, the receiving signal processing unit 200 may a spatial demapper for converting the Fourier transformed receiver chains to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder, the receiving signal processing unit 100 may not use the encoder deparser.

Figure 4:
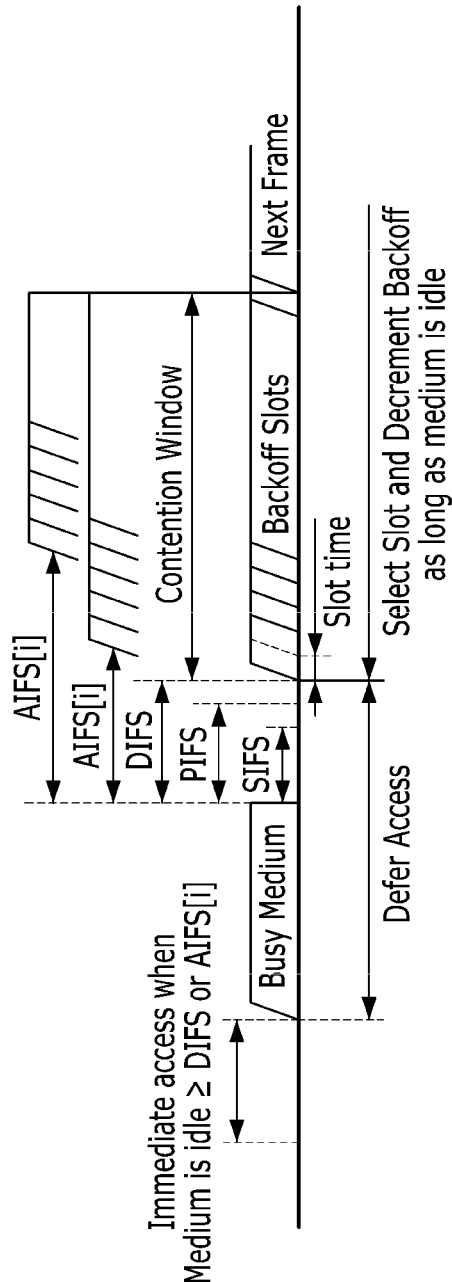
FIG. 4 exemplifies IFS relationships.

FIG. 4 exemplifies interframe space (IFS) relationships.

A data frame, a control frame, or a management frame may be exchanged between WLAN devices.

The data frame is used for transmission of data forwarded to a higher layer. The WLAN device transmits the data frame after performing backoff if a distributed coordination function IFS (DIFS) has elapsed from a time when the medium has been idle. The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for access category (AC), i.e., AIFS[AC], has elapsed. In this case, the data frame, the management frame, or the control frame which is not the response frame may use the AIFC[AC].

Figure 5:
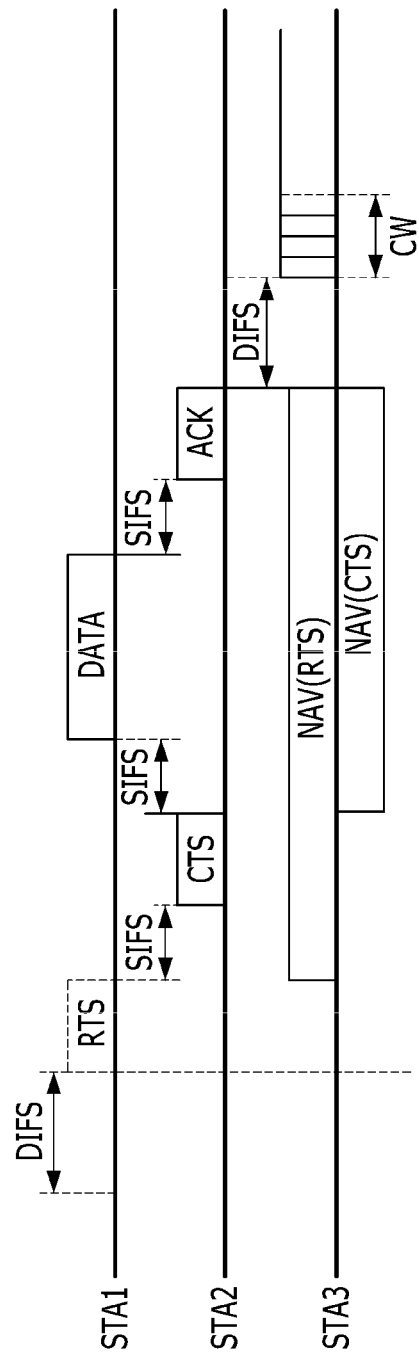
FIG. 5 is a schematic diagram explaining CSMA/CA based frame transmission procedure for avoiding collision between frames in a channel.

FIG. 5 is a schematic diagram explaining a CSMA (carrier sense multiple access)/CA (collision avoidance) based frame transmission procedure for avoiding collision between frames in a channel.

Referring to FIG. 5, STA1 is a transmit WLAN device for transmitting data, STA2 is a receive WLAN device for receiving the data, and STA3 is a WLAN device which may be located at an area where a frame transmitted from the STA1 and/or a frame transmitted from the STA2 can be received by the WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When determining that the channel is not used by other devices during DIFS (that is, the channel is idle), the STA1 may transmit an RTS frame to the STA2 after performing backoff. Upon receiving the RTS frame, the STA2 may transmit a CTS frame as a response of the CTS frame after SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When the STA3 receives the CTS frame, it may set the NAV timer for a transmission duration of subsequently transmitted frames (for example, a duration of SIFS+data frame duration+SIFS+ACK frame duration) by using duration information included in the RTS frame. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, the STA3 may determine whether the channel is busy by the carrier sensing. Upon determining that the channel is not used by the other devices during DIFS after the NAV timer has expired, the STA3 may attempt the channel access after a contention window according to random backoff elapses.

Now, a frame transmitting method and a frame receiving method in a wireless communication network according to an embodiment of the present invention is described with reference to the drawings. A wireless communication network according to an embodiment of the present invention an embodiment of the present invention may be a WLAN. Particularly, the wireless communication network according to an embodiment of the present invention an embodiment of the present invention may be a high efficiency (HE) WLAN developed by the IEEE 802.11ax task group. Hereinafter, it is assumed for convenience that the wireless communication network according to an embodiment of the present invention is the HE WLAN.

Figure 6:
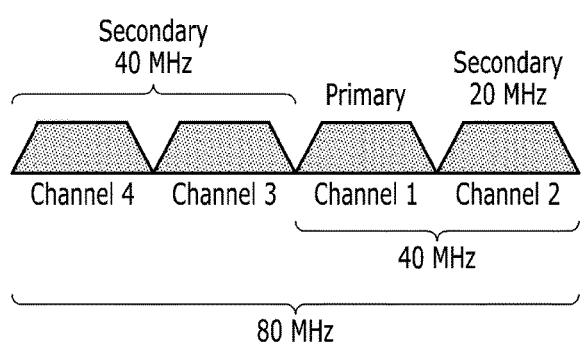
FIG. 6 shows an example of a channel width used in a wireless communication network according to an embodiment of the present invention.
Figure 7:
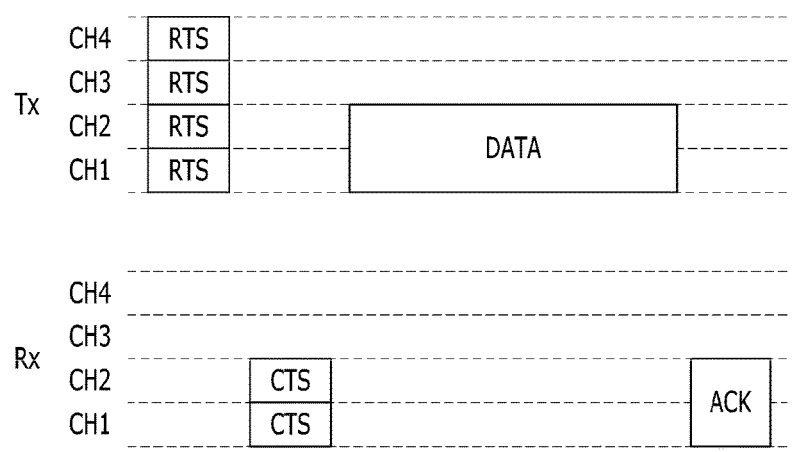
FIG. 7 shows an operation example of a transmitting device and a receiving device in a wireless communication network according to an embodiment of the present invention.

FIG. 6 shows an example of a channel width used in a wireless communication network according to an embodiment of the present invention, and FIG. 7 shows an operation example of a transmitting device and a receiving device in a wireless communication network according to an embodiment of the present invention.

A channel that can be used in a HE WLAN which is an example of a wireless communication network according an embodiment of the present invention is divided into a primary channel and a plurality of secondary channels. For example, as shown in FIG. 6, an 80 MHz channel width may be divided into a primary channel having a 20 MHz bandwidth (hereinafter referred to as a "primary 20 MHz channel"), a secondary channel having a 20 MHz bandwidth (hereinafter referred to as a "secondary 20 MHz channel"), and a secondary channel having a 40 MHz bandwidth (hereinafter referred to as a "secondary 40 MHz channel").

In a WLAN (hereinafter referred to as a "VHT WLAN") according to the IEEE standard 802.11ac (IEEE Std 802.11ac-2013) for enhancements for very high throughput (VHT), the primary channel is always included in all frame transmissions and the secondary channels are additionally used. Therefore, the primary 20 MHz channel is used for a 20 MHz bandwidth transmission, the primary 20 MHz channel and the secondary 20 MHz channel are used for a 40 MHz bandwidth transmission, and the primary 20 MHz channel, the secondary 20 MHz channel and the secondary 40 MHz channel are used for a 80 MHz bandwidth transmission. Two 80 MHz bandwidths are combined and used for a 160 MHz bandwidth transmission. As such, the other secondary channel can be used together with the primary channel in the VHT WLAN.

In this case, the VHT WLAN has adopted dynamic bandwidth allocation for dynamically determining a frequency bandwidth to be used by exchanging a request to send (RTS) frame and a clear to send (CTS) frame, in consideration of a case that interference condition is different between a transmitting device and a receiving device.

For example, as shown in FIG. 7, a transmitting device may transmit a request frame, for example an RTS frame, occupying an 80 MHz band when it determines that the whole of the 80 MHz band is available. In this case, only a 40 MHz band CH1 and CH2 including a primary 20 MHz channel CH1 and a secondary 20 MHz channel CH2 may be available in a receiving device, and a remaining secondary 40 MHz channel CH3 and CH4 may be unavailable due to the interference. The receiving device sends a response frame, for example a CTS frame, occupying the 40 MHz band CH1 and CH2 to the transmitting device.

The transmitting device and the receiving device may be devices (hereinafter referred to as "HE devices") supporting a wireless communication network an embodiment of the present invention, i.e., a HE WLAN.

The transmitting device and the receiving device can recognize the available band by exchanging the request frame and the response frame. Then, the transmitting device transmits a data frame though the 40 MHz band CH1 and CH2 including the primary channel CH1, and the receiving device transmits an acknowledgement (ACK) frame through the 40 MHz band CH1 and CH2.

In some embodiments, an interval between the frames may be an SIFS interval.

In some embodiments, the request frame or the response frame transmitted through the 80 MHz band or the 40 MHz band may be formed by a format (i.e., a legacy duplicated format) duplicating a request frame or a response frame of a frame format (i.e., a legacy frame format) supporting the IEEE standard 802.11a (IEEE Std 802.11a-1999) or the IEEE standard 802.11g (IEEE Std 802.11g-2003).

A data field of a PHY frame to which the request frame or the response frame is mapped includes a service field. The service field corresponds to the first 16 bits of the data field, and the first 7 bits of the service field correspond to scrambler initialization bits. A scrambler of a device (hereinafter referred to as a "VHT device") supporting the VHT WLAN generates a scrambling sequence by repeatedly generating a 127-bit sequence from a 7-bit scrambler seed. Accordingly, the scrambler seed is one-to-one mapped to the first 7 bits of the scrambling sequence. Since the scrambler initialization bits are set to "0000000," the first 7 bits of data that are outputted by scrambling the data field before being scrambled are equal to the first 7 bits of the scrambling sequence. The VHT device indicates whether a dynamic bandwidth is applied by the fifth bit of the scrambler seed, and indicates which bandwidth a current frame uses used among 20 MHz, 40 MHz, 80 MHz and 160 MHz by the sixth and seventh bits.

However, there is a restriction in the VHT WLAN that the primary channel should be always included regardless of which bandwidth being used. Accordingly, in a circumstance where much interference has an influence on the primary channel, the secondary channel cannot be used even if it has not been occupied. Further, the VHT WLAN recommends that neighbor BSSs match the primary channel if possible. Therefore, if a certain BSS uses the primary channel, a neighbor BSS cannot use the secondary channel since the interference exists on the primary channel of the neighbor BSS. Further, there is a restriction in the VHT WLAN that the secondary 40 MHz channel should be always used consecutively to the secondary 20 MHz channel. As such, the VHT WLAN does not efficiently divide and use the wide band.

However, in a wireless communication network according to an embodiment of the present invention, a plurality of channels including the primary channel and the secondary channels are independently used. For example, a HE device may transmit a frame only using the secondary channel without the primary channel, or may transmit a frame using two or more channels that are not consecutive. For the independent use of the plurality of channels, a transmission scheme such as for example an orthogonal frequency division multiple access (OFDMA) scheme may be used in a wireless communication network according to an embodiment of the present invention.

Figure 8:
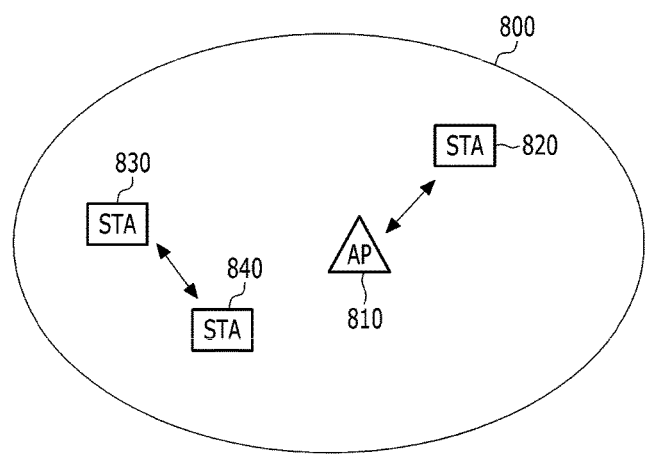
FIG. 8 shows an example of a wireless communication network according to an embodiment of the present invention.
Figure 9:
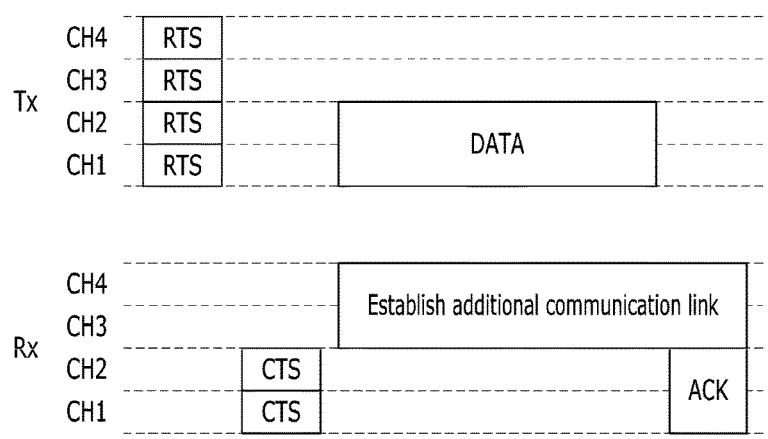
FIG. 9 shows an example of channel reuse in a wireless communication network according to an embodiment of the present invention.
Figure 10:
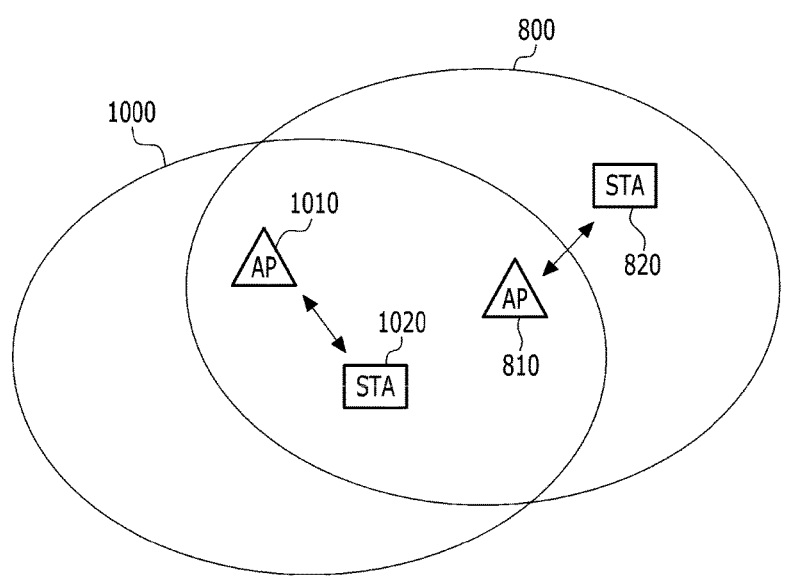
FIG. 10 shows another example of a wireless communication network according to an embodiment of the present invention.

FIG. 8 shows an example of a wireless communication network according to an embodiment of the present invention, FIG. 9 shows an example of channel reuse in a wireless communication network according to an embodiment of the present invention, and FIG. 10 shows another example of a wireless communication network according to an embodiment of the present invention.

Referring to FIG. 8, a BSS 800 includes a plurality of WLAN devices. The plurality of WLAN devices include a device 810 that is an access point (AP) and devices 820, 830, and 840 that are non-AP stations. Hereinafter, the non-AP station is referred to as a station (STA) for convenience.

The AP 810 and the station 820, 830, and 840 may be HE devices. Alternatively, the AP 810 and the station 820 may be previous version devices. The previous version device may be, for example, a device (hereinafter referred to as a "legacy device") supporting the IEEE standard 802.11a (IEEE Std 802.11a-1999) or the IEEE standard 802.11g (IEEE Std 802.11g-2003), a device (hereinafter referred to as an "HT device") supporting the IEEE standard 802.11n (IEEE Std 802.11n-2009) for enhancements for higher throughput (HT), or a VHT device.

In the BSS 800, the AP 810 and the station 820 may establish a communication link by a dynamic bandwidth scheme. For example, the AP 810 and the station 820 may establish the communication link on a 40 MHz band including a primary channel and a secondary 20 MHz channel. For this, as shown in FIG. 9, a transmitting device (for example, the AP 810) transmits a request frame (for example, an RTS frame) to a receiving device (for example, the station 820), and the receiving device transmits a response frame (for example, a CTS frame) to the transmitting device in response to the request frame.

In this case, the transmitting device may transmit the request frame occupying the 80 MHz band. The receiving device may transmit the response frame occupying the 40 MHz band including the primary channel CH1 and the secondary 20 MHz channel CH2 when the secondary 40 MHz channel CH3 and CH4 is unavailable due to the interference. The request frame may include bandwidth information indicating that the 80 MHz band CH1, CH2, CH3, and CH4 is used, and the response frame may include bandwidth information that the 40 MHz band CH1 and CH2 is used. Alternatively, when the transmitting device cannot use the secondary 40 MHz channel CH3 and CH4 due to the interference, the transmitting device may transmit the request frame occupying the 40 MHz band including the primary channel CH1 and the secondary 20 MHz channel CH2. Then, the receiving device may transmit the response frame occupying the 40 MHz band CH1 and CH2 when there is no interference on the 40 MHz band CH1 and CH2. Each of the request frame and the response frame may include the bandwidth information indicating that the 40 MHz band CH1 and CH2 is used. In some embodiments, the bandwidth information may be a dynamic bandwidth indication.

Other stations 830 and 840 within the BSS 800 can determine that the secondary 40 MHz channel CH3 and CH4 is not used through the request frame and the response frame which are exchanged by the AP 810 and the station 820. Accordingly, the two stations 830 and 840 may establish a terminal-to-terminal direct communication link between the stations 830 and 840 through the secondary 40 MHz channel CH3 and CH4. Alternatively, the two stations 830 and 840 may establish a communication link passing through the AP 810 such as a tunneled direct link setup (TDLS) between the stations 830 and 840 by the secondary 40 MHz channel CH3 and CH4. In this case, the AP 810 may simultaneously support channels CH1 and CH2 including the primary channel and channels CH3 and CH4 including the secondary 40 MHz channel.

Since the stations 830 and 840 establish the communication link by using the secondary channel that is not used in the BSS 800, the communication link may not have an influence on the existing communication link within the BSS 800.

Referring to FIG. 10, a BSS 1000 neighboring to the BSS 800 exists and the BSS 1000 includes an AP 1010 and a station 1020. The AP 1010 and the station 1020 may be HE devices.

As described with reference to FIG. 8, the AP 810 and the station 820 may establish a communication link by a dynamic bandwidth scheme in the BSS 800. For example, the AP 810 and the station 820 may establish the communication link on the 40 MHz band including the primary channel and the secondary 20 MHz channel. For this, a transmitting device (for example, the AP 810) transmits a request frame to a receiving device (for example, the station 820), and the receiving device transmits a response frame to the transmitting device in response to the request frame.

Then, the AP 1010 and the station 1020 of the neighbor BSS 1000 can determine that the secondary 40 MHz channel is not used through the request frame and the response frame which are exchanged by the AP 810 and the station 820 of the BSS 800. Accordingly, the AP 1010 and the station 1020 can establish a communication link through the secondary 40 MHz channel. Since the AP 1010 and the station 1020 establish the communication link by using the secondary channel that is not used in the neighbor BSS 800, the communication link may not have an influence on the existing communication link within the BSS 800.

In some embodiments, the stations 830 and 840 shown in FIG. 8 or the AP 1010 and the station 1020 shown in FIG. 10 can identify a channel to be used after the response frame, based on the bandwidth information included in the request frame and the response frame which are exchanged by the AP 810 and the station 820. Accordingly, the stations 830 and 840 or the AP 1010 and the station 1020 can establish the communication link through other channels CH3 and CH4 except the corresponding channel.

In some embodiments, the AP 810 and the station 820 can exchange frames during transmission duration, i.e., transmission opportunity (TXOP) duration reserved by the request frame and the response frame. Accordingly, the stations 830 and 840 or the AP 1010 and the station 1020 can establish a communication link through other channels CH3 and CH4 during the TXOP duration reserved by the request frame and the response frame. The stations 830 and 840 or the AP 1010 and the station 1020 may identify the TXOP duration through duration/ID fields of the request frame and the response frame.

It has been described in FIG. 9 that the TXOP is identified through the RTS frame and the CTS frame that are examples of the request frame and the response frame. In some embodiments, a frame exchange such as an exchange of a beamforming poll frame and a beamforming report frame or an exchange of a data frame and an ACK frame may be used another example of the exchange of the request frame and the response frame.

In some embodiments, a device that cannot receive the request frame of the transmitting device but can receive the response frame of the receiving device may establish the additional communication link based on the bandwidth information included in the response frame.

In some embodiments, when a plurality of neighbor BSSs whose primary channel do not match exist, the primary channel of a certain BSS may exist on a band for establishing the additional communication link. In this case, different priorities may be assigned to a previous version device, a HE device, and a device for establishing the additional communication link within the certain BSS such that an attempt to occupy the channel can be adjusted. The priorities may be adjusted by using an IFS or a contention window minimum value (CWmin).

While a method for using an unoccupied channel has been described on a basis of the VHT WLAN channels, each basic bandwidth may be independently used or a channel combining discontinuous basic bandwidths may be used in the entire channel width. For example, it is assumed that the basic bandwidth is 20 MHz. Then, each of a primary channel, a secondary 20 MHz channel, an upper 20 MHz part of a secondary 40 channel, and a lower 20 MHz part of the secondary 40 channel may be used as a 20 MHz channel. A 40 MHz channel may be formed by a combination the primary channel and the secondary 20 MHz channel, a combination of the primary channel and the lower 20 MHz part of the secondary 40 MHz channel, a combination of the primary channel and the upper 20 MHz part of the secondary 40 MHz channel, a combination of the secondary 20 MHz channel and the lower 20 MHz part of the secondary 40 MHz channel, a combination of the secondary 20 MHz channel and the upper 20 MHz part of the secondary 40 MHz channel, and a combination of the lower 20 MHz part and the upper 20 MHz part of the secondary 40 MHz channel.

Further, a 60 MHz channel may be formed by three parts of the primary channel, the secondary 20 MHz channel, the lower 20 MHz part of the secondary 40 MHz channel, and the upper 20 MHz part of the secondary 40 MHz channel, and an 80 MHz channel may formed by four parts. In the case the a 160 MHz channel width is used, a 20 MHz channel, a 40 MHz channel, a 60 MHz channel, an 80 MHz channel, a 100 MHz channel, a 120 MHz channel, a 140 MHz channel, and a 160 MHz channel may be formed by various combinations.

Alternatively, the basic bandwidth may be formed as a band narrower than the 20 MHz, for example 10 MHz or 5 MHz.

In this case, a request frame or a response frame, for example an RTS frame or a CTS frame, may include bandwidth information. For example, when a 20 MHz bandwidth is used as the basic bandwidth in the 160 MHz channel width, the bandwidth information may be represented as 8 bits. For example, when an 80 MHz channel is used by 40 MHz bandwidths of both ends in the 160 MHz channel width, the bandwidth information may be represented as "11000011."

The bandwidth information may be included in a data field or a signal field of a frame. Hereinafter, an example of a frame including bandwidth information is described with reference to FIG. 11 to FIG. 18.

Figure 11:
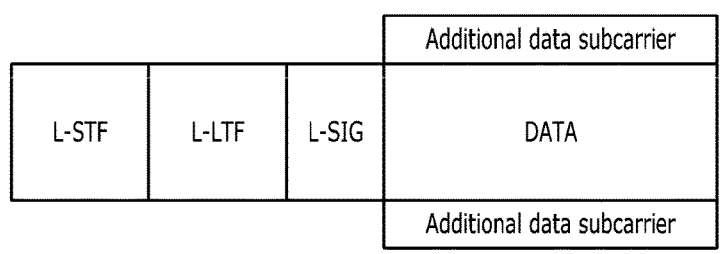
FIG. 11 shows an example of a frame format in a wireless communication network according to an embodiment of the present invention.

FIG. 11 shows an example of a frame format in a wireless communication network according to an embodiment of the present invention, FIG. 12 shows an example of a subcarrier allocation in a 20 MHz transmission mode of a previous WLAN, and FIG. 13 shows an example of a subcarrier allocation in a wireless communication network according to an embodiment of the present invention.

Referring to FIG. 11, a request frame or a response frame includes a legacy short training field (L-STF), a legacy long training field (L-LTF), a legacy signal field (L-SIG), and a data field. The L-STF and the L-LTF may be used for synchronization and channel estimation. The L-SIG may include rate and length information of the data field. The L-STF and the L-LTF each include two symbols, i.e., orthogonal frequency division multiplexing (OFDM) symbols, and the L-SIG includes one symbol. The data field may include a service field, a MAC frame part, and tail bits, and may further include, if necessary, pad bits. As such, the request frame or response frame uses a legacy frame format defined in the legacy (IEEE 802.11a or IEEE 802.11g) WLAN for the backward compatibility with the previous WLAN.

Among a plurality of subcarriers included in each symbol of the data field, M subcarriers besides subcarriers that are allocated to data subcarriers in the previous WLAN are used as additional data subcarriers for carrying bandwidth information. Here, M is an integer greater than or equal to one.

The number of subcarriers included in one symbol is determined by a size of a fast Fourier transform (FFT) that is used. As described above, the request frame or response frame uses the legacy frame format. In the legacy frame format, when an inverse Fourier transformer (140 of FIG. 2) of the transmitting device performs an inverse Fourier transform, 64 FFT is used on a 20 MHz bandwidth basis. Accordingly, one symbol of the frame shown in FIG. 6 includes 64 subcarriers. In the legacy frame format, 64 subcarriers include one subcarrier used as a DC (direct current) subcarrier, four subcarriers used as pilots, and eleven subcarriers used as guards. Accordingly, 48 subcarriers among the 64 subcarriers are used as data subcarriers. As exemplified in FIG. 12, when a subcarrier index of the DC is 0, tones whose subcarrier indices are −21, −7, 7, and 21 may be used as the pilots, and some tones (i.e., tones whose subcarrier indices are −32 to −27 and 27 to 31) of both ends with the DC as the center may be used as the guards.

In some embodiments, as shown in FIG. 13, negative subcarriers whose indices are −28 and −27 and positive subcarriers whose indices are 27 and 28 among the 64 subcarriers may be used as the additional data subcarriers in replace of the guards among the 64 subcarriers. Accordingly, four subcarriers in one symbol can be used as the additional data subcarriers. In another embodiment, subcarriers of the number different from four may be used as the additional data subcarriers.

As described above, since subcarriers which have not been used as the data subcarrier in the previous WLAN are used as the additional data subcarrier in the data field of the request frame or response frame, bandwidth information can be carried through the additional data subcarriers.

Since the additional data subcarriers correspond to the guards of the previous WLAN, the previous WLAN device, for example a legacy device, an HT device, or a VTH device determines the additional data subcarrier as the guards and does not demodulate or use the additional data subcarriers. However, a HE device can determine the additional data subcarriers as the data subcarriers and interpret the additional data subcarriers. Accordingly, additional signaling information can be transmitted with maintaining the backward compatibility with the previous WLAN.

Figure 14:
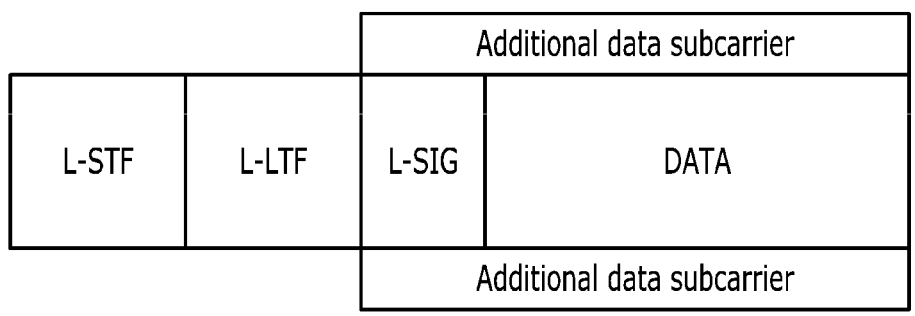
FIG. 14, FIG. 15 and FIG. 16 show other examples of a frame format in a wireless communication network according to an embodiment of the present invention.
Figure 15:
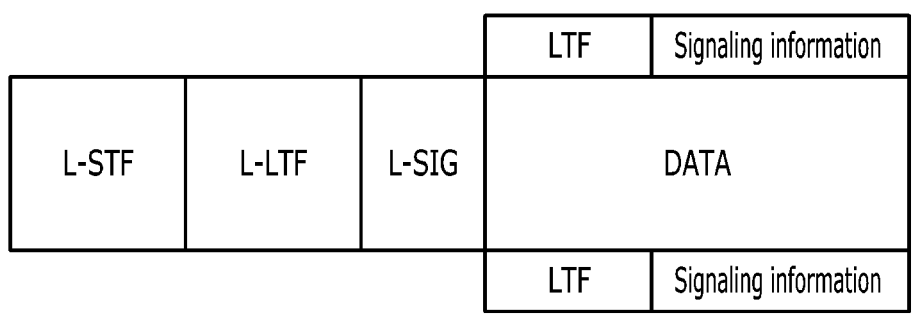
Figure 16:
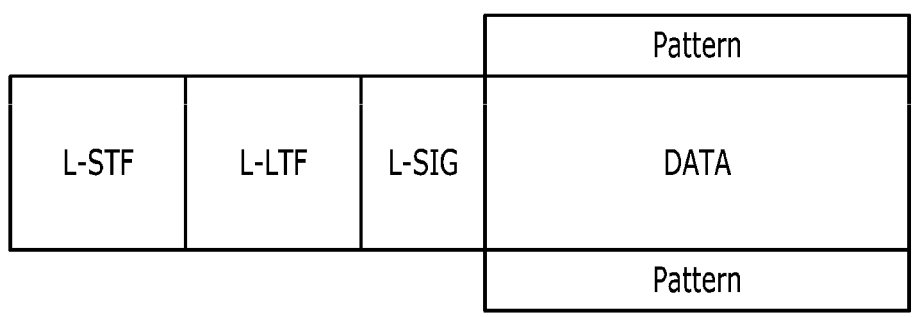
Figure 17:
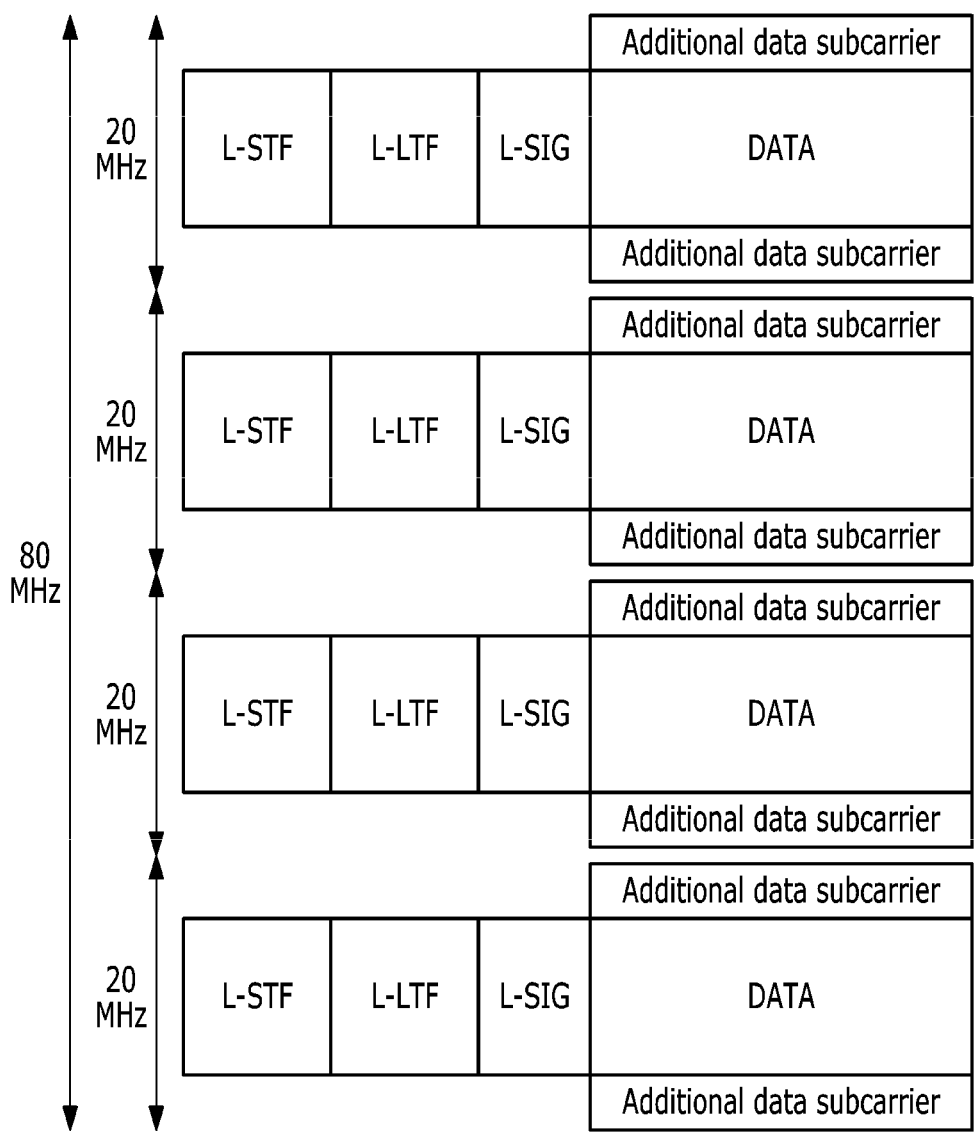
FIG. 17 and FIG. 18 show examples of a frame format at a multi-band in a wireless communication network according to an embodiment of the present invention.
Figure 18:
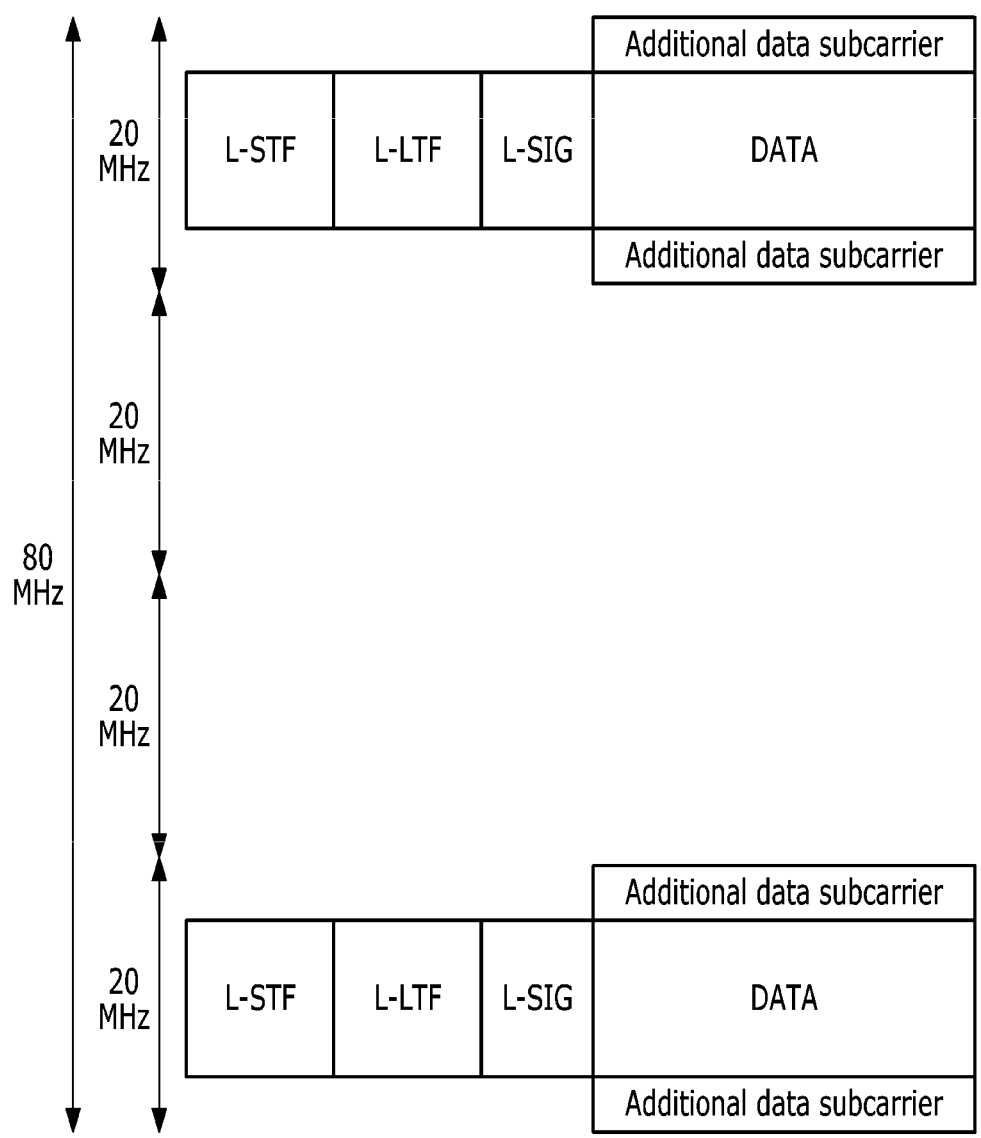

FIG. 14, FIG. 15 and FIG. 16 show other examples of a frame format in a wireless communication network according to an embodiment of the present invention, and FIG. 17 and FIG. 18 show examples of a frame format at a multi-band in a wireless communication network according to an embodiment of the present invention.

Referring to FIG. 14, in some embodiments, additional data subcarriers may be used in the L-SIG as well as the data field. Then, the additional data subcarriers corresponding to the L-SIG, i.e., one symbol can be additionally used.

In another embodiment, the additional data subcarriers may not be used in the data field and may be used only in the L-SIG. In yet another embodiment, the additional data subcarriers may be used in at least part of the L-STF, the L-LTF, the L-SIG, and the data field.

Referring to FIG. 15, in some embodiments, a transmitting device may code and modulate information that is transferred by additional data subcarriers in the same manner as information that is transferred by other data subcarriers. In this case, a part of the additional data subcarriers may be used as a long training field (LTF) for channel estimation on the additional data subcarriers. For example, the additional data subcarriers corresponding to two symbols may be used as the LTF for the channel estimation like the L-LTF.

Accordingly, a receiving device can estimate a channel corresponding to the additional data subcarriers based on the LTF.

Referring to FIG. 16, in some embodiments, signaling information that is transferred by additional data subcarriers may be provided in a form of predetermined pattern. For example, when additional data subcarriers are used in N symbols and four subcarriers are assigned to the additional data subcarriers in one symbol, the signaling information may be transmitted in a pattern of 4×N matrix. For example, patterns of a predetermined number may be defined, and each pattern may be assigned predetermined information. Accordingly, a receiving device can acquire information provided by the transmitting device, based on the pattern formed by the additional data subcarriers of the received frame.

For example, when the additional data subcarriers are used in eight symbols of a frame, the bandwidth information of "11000011" may be inserted into the eight symbols by a pattern of +1, +1, −1, −1, −1, −1, +1, +1 in a BPSK format.

As such, when the bandwidth information to be transferred by the additional data subcarriers is provided by the predetermined pattern, the receiving device can interpret the bandwidth information even if failing to estimate the channel. Further, even though the transmitting device transmits the bandwidth information on the additional data subcarriers without coding and/or modulating the bandwidth information, the receiving device can interpret the bandwidth information based on the pattern.

In one embodiment, since the previous version device can receive a frame transmitted on the primary channel as well as the HE device, the request frame or the response frame can be transmitted only on a basic bandwidth of the primary channel.

In another embodiment, in the request frame or the response frame, each field of the basic bandwidth in the primary channel may be duplicated to the other basic bandwidth as shown in FIG. 17. For example, when an 80 MHz channel width is used, the request frame or the response frame of the primary channel may be duplicated to three other 20 MHz bandwidths. In this case, data on additional data subcarriers of the primary channel may be duplicated to additional data subcarriers of other basic bandwidths. Then, a device of a neighbor BSS whose primary channel does not match a current BSS can identify bandwidth information by receiving the request frame or the response frame on its primary channel.

In another embodiment, the request frame or the response frame may be transmitted only on channels of used bandwidths as shown in FIG. 18. That is, as shown in FIG. 18, when a device determines to use a 40 MHz channel by using 20 MHz bandwidths of both ends in an 80 MHz channel width, the device may transmits a response frame including bandwidth information on the 20 MHz bandwidths of the 80 MHz channel width. The request frame or the response frame may be transmitted on consecutive bands or may be transmitted on inconsecutive bands in accordance with the used bandwidths.

An RTS frame, a CTS frame or an ACK frame that may be used as the request or response frame is a control frame and has a legacy frame format that can be demodulated by a previous version device. Since a dynamic bandwidth indication used in the legacy frame format can indicate only continuous bandwidths such as 20 MHz, 40 MHz, and 80 MHz, the dynamic bandwidth indication cannot indicate used bandwidths when discontinuous bandwidths are used. Accordingly, in some embodiments, a frame including bandwidth information may be used as the request or response frame as described above. Hereinafter, such embodiments are described with reference to FIG. 19 to FIG. 22.

Figure 19:
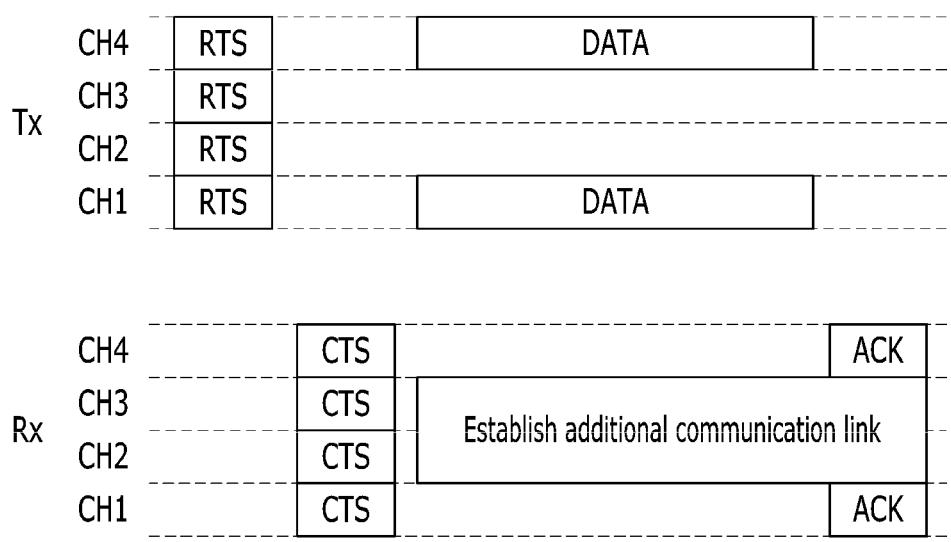
FIG. 19, FIG. 20, and FIG. 21 show examples of channel reuse in a wireless communication network according to another embodiment of the present invention.
Figure 20:
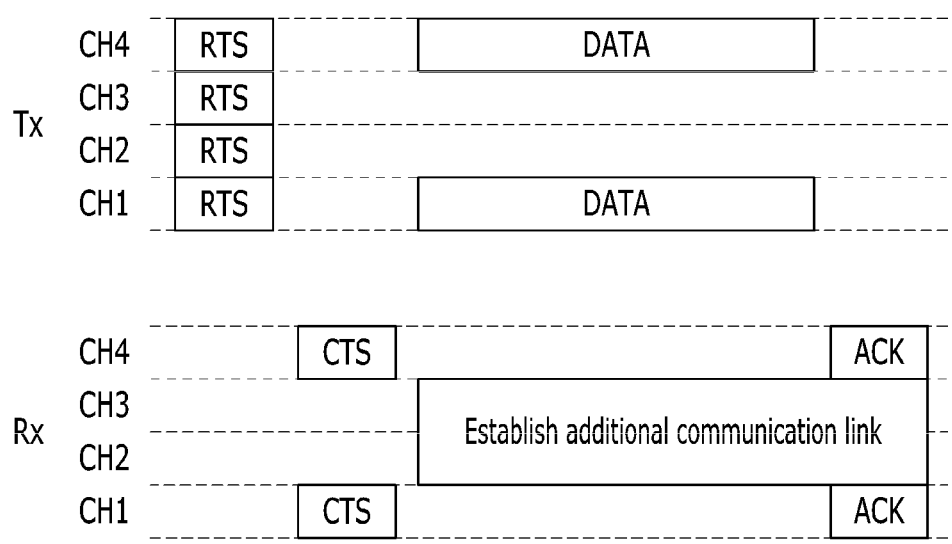
Figure 21:
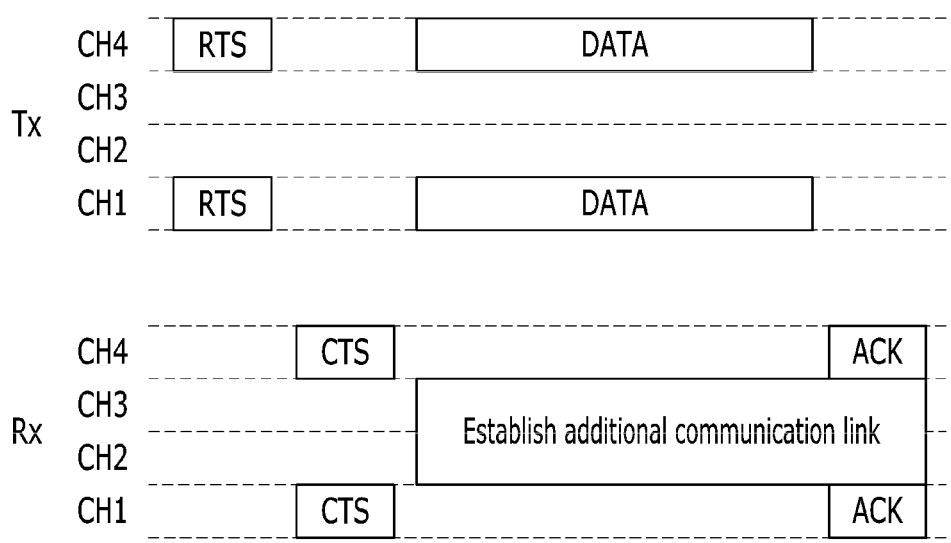
Figure 22:
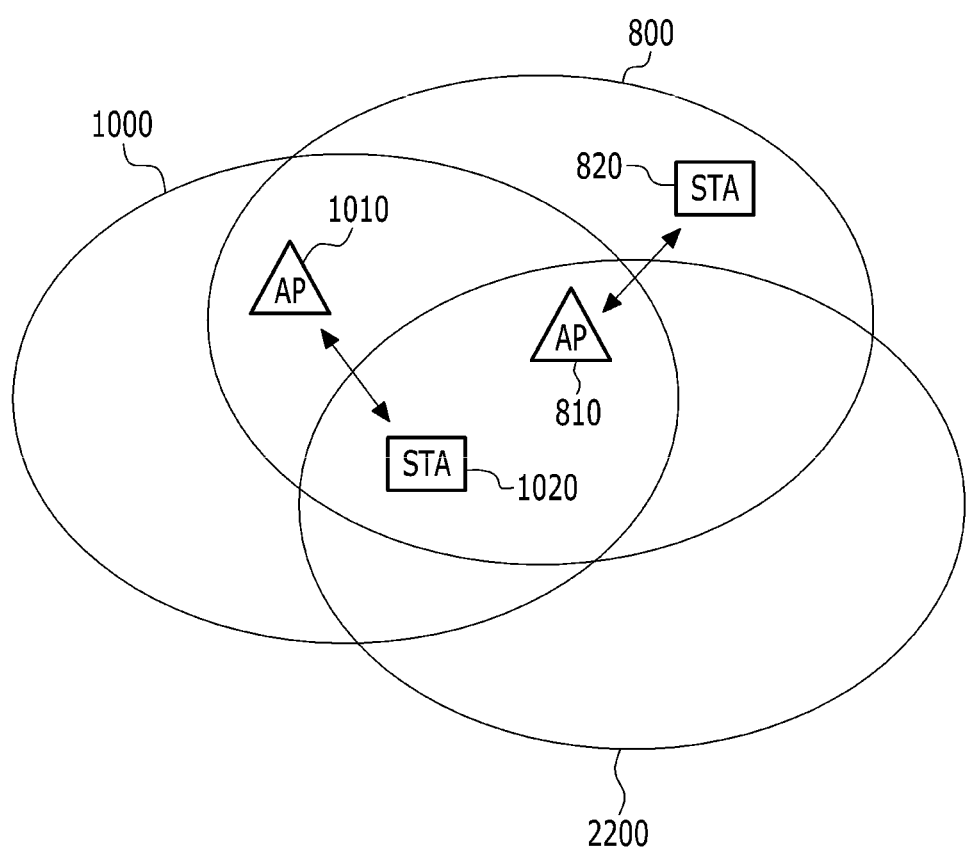
FIG. 22 shows another example of a wireless communication network according to an embodiment of the present invention.

FIG. 19, FIG. 20, and FIG. 21 show examples of channel reuse in a wireless communication network according to another embodiment of the present invention, and FIG. 22 shows another example of a wireless communication network according to an embodiment of the present invention.

It is assumed in FIG. 19 to FIG. 22 that an entire channel width is 80 MHz, 20 MHz bands (i.e., a total 40 MHz band) of both ends in the 80 MHz are available, and one of the 20 MHz bands of both ends corresponds to a primary channel. Further, it is assumed in FIG. 19 to FIG. 22 that a transmitting device and a receiving device correspond to an AP 810 and a station 820 of a BSS 800 shown in FIG. 10, respectively.

Referring to FIG. 10 and FIG. 19, in one embodiment, the transmitting device 810 may transmit a request frame (for example, an RTS frame) through the 80 MHz band of the entire channel width, and the receiving device 820 may transmit a response frame (for example, a CTS frame) through the 80 MHz band. The request frame may include 80 MHz or narrower band as bandwidth information that is available in the transmitting device 810. The response frame includes bandwidth information that is available in the receiving device 820. The receiving device 820 selects bands CH1 and CH4 which the receiving device 820 can use from the available bandwidth information that is reported by the request frame. In some embodiments, the response frame may transfer the bandwidth information through additional data subcarriers.

The transmitting device 810 transmits a data frame through the bands CH1 and CH4 that are indicated by the bandwidth information included in the response frame, and the receiving device 820 transmits an ACK frame on the data frame through the same bands CH1 and CH4.

In some embodiments, a dynamic bandwidth indication set to a scrambler seed of a data field in the request frame and the response frame may indicate the 80 MHz for a VHT device.

A previous version device sets a NAV according to the response frame transmitted through the primary channel and does not use the entire 80 MHz band.

However, a HE device that is not the receiving device can determine that remaining bands (for example, a 40 MHz band CH2 and CH3 in the middle) except the used 40 MHz band are not used, from the bandwidth information of the response frame. Accordingly, the HE device may establish a communication link with another HE device by using unoccupied bands CH2 and CH3 of the secondary channel. Since the HE device can know transmission duration of the 40 MHz band CH1 and CH4 including the primary channel through the request frame or the response frame, the HE device can match (i.e., align) an end time (for example, TXOP duration) of a transmission using the unoccupied secondary channel to an end time (for example, TXOP duration) of a transmission including the primary channel such that the channels can be efficiently used.

As shown in FIG. 10, a BSS 1000 neighboring to the BSS 800 may exist. The neighbor BSS 1000 may be an OBSS whose primary channel is the same as the primary channel of the BSS 800. In this case, a previous version device 1010 or 1020 belonging to the OBSS 1000 receives the request frame or the response frame to determine that the primary channel is used, and does not use the entire band.

Alternatively, the neighbor BSS 1000 may be a BSS whose primary channel is different from the primary channel of the BSS 800. Even if the primary channel of the OBSS 1000 is the same as the primary channel of the BSS 800, since the request frame or the response frame is transmitted through a band including the primary channel of the OBSS 1000, a previous version device 1010 or 1020 belonging to the OBSS 1000 receives the request frame or the response frame to determine that the primary channel is used, and does not use the entire band. Accordingly, the HE device of the BSS 800 can stably establish the communication link using the unoccupied band, but the previous device belonging to the neighbor BSS 1000 may miss a transmission opportunity on the unoccupied primary channel due to the request frame or the response frame.

However, a HE device 1010 or 1020 belonging to the neighbor BSS 1000 can know the used band from the bandwidth information of the response frame regardless of whether the BSS 1000 is the OBSS. Therefore, the HE device 1010 or 1020 can establish a communication link with another HE device through the unoccupied band except the used band. Further, the HE device of the neighbor BSS 1000 can know through the request frame or the response frame transmission duration of the 40 MHz band including the primary channel in the BSS 800. Accordingly, the HE device can match an end time (for example, TXOP duration) of a transmission using the unoccupied secondary channel to an end time (for example, TXOP duration) of a transmission including the primary channel such that the channels can be efficiently used.

Referring to FIG. 20, in another embodiment, the transmitting device may transmit a request frame (for example, an RTS frame) through the 80 MHz band of the entire channel width, and the receiving device may transmit a response frame (for example, a CTS frame) through an available band (for example, 20 MHz bands CH1 and CH4 of both ends). The request frame may include 80 MHz or narrower band as bandwidth information that is available in the transmitting device. The response frame includes bandwidth information that is available in the receiving device. The receiving device selects bands CH1 and CH4 which the receiving device can use from the available bandwidth information that is reported by the request frame. In some embodiments, the response frame may transfer the bandwidth information through additional data subcarriers.

Referring to FIG. 21, in yet another embodiment, the transmitting device may transmit a request frame (for example, an RTS frame) through available band (for example, 20 MHz bands CH1 and CH4 of both ends), and the receiving device may transmit a response frame (for example, a CTS frame) through an available band (for example, the 20 MHz bands CH1 and CH4 of the both ends). The request frame may include 80 MHz or narrower band as bandwidth information that is available in the transmitting device. The response frame includes bandwidth information that is available in the receiving device. The receiving device selects bands CH1 and CH4 which the receiving device can use from the available bandwidth information that is reported by the request frame. In some embodiments, the response frame may transfer the bandwidth information through additional data subcarriers.

In FIG. 20 and FIG. 21, the transmitting device 810 transmits a data frame on the bands CH1 and CH4 indicated by the bandwidth information included in the response frame, and the receiving device 820 transmits an ACK frame on the data frame through the same bands CH1 and CH4. A previous version device sets an NAV on the entire band according to the response frame transmitted on the primary channel and does not use the 80 MHz entire band.

When the neighbor BSS 1000 is an OBSS whose primary channel is the same as the primary channel of the BSS 800, a previous version device 1010 or 1020 belonging to the OBSS 1000 operates as described with reference to FIG. 19.

Alternatively, when the primary channel of the neighbor BSS 1000 is different from the primary channel of the BSS 800, the previous version device 1010 or 1020 belonging to the OBSS 1000 determines that the primary channel (for example, CH2) is not occupied because the response frame is not transmitted on the primary channel CH2. Accordingly, the previous version device 1010 or 1020 may attempt to use the unoccupied primary channel CH2 through carrier sensing. Therefore, differently from an embodiment with reference to FIG. 19, a transmission opportunity can be assign to the previous version device belonging to the neighbor BSS 1000.

In some embodiments, since a HE device of the OBSS 1000 can also use the unoccupied bands CH2 and CH3 in FIG. 20 and FIG. 21, the HE device and the previous version device may attempt to use the primary channel CH2 through the contention. In this case, when the previous version device acquires a transmission opportunity through the primary channel CH2, the previous version device may perform the carrier sensing with low carrier sensing requirements. Further, since the previous version device does not know an end time of a data frame transmitted from the BSS 800, the previous version device may not match an end time (for example, TXOP duration) of its transmission to an end time (for example, TXOP duration) of a transmission through the 40 MHz band in the BSS 800. Therefore, the channels may not be efficiently used.

As shown in FIG. 22, a BSS 2200 neighboring to a BSS 800 may further exist in embodiments shown in FIG. 10, FIG. 19, FIG. 20, and FIG. 21. It is assumed that a neighbor BSS 1000 is an OBSS of the BSS 800 and a primary channel of the neighbor BSS 2200 is different from a primary channel of the BSS 800.

When a request frame and a response frame are transmitted in the BSS 800 as shown in FIG. 19, previous version devices of the neighbor BSSs 1000 and 2200 receiving the request frame or the response frame do not acquire a transmission opportunity.

When the request frame and the response frame are transmitted in the BSS 800 as shown in FIG. 20, the previous version device of the BSS 1000 whose primary channel CH1 is the same as the primary channel of the BSS 800 does not acquire the transmission opportunity, but the previous version device of the BSS 2200 whose primary channel CH1 is different from the primary channel of the BSS 800 may acquire the transmission opportunity. In this case, a device transmitting the response frame in the BSS 800 determines whether to permit the transmission opportunity.

When the request frame and the response frame are transmitted in the BSS 800 as shown in FIG. 21, the previous version device of the BSS 1000 whose primary channel CH1 is the same as the primary channel of the BSS 800 does not acquire the transmission opportunity, but the previous version device of the BSS 2200 whose primary channel CH1 is different from the primary channel of the BSS 800 may acquire the transmission opportunity. In this case, a device transmitting the request frame in the BSS 800 determines whether to permit the transmission opportunity.

On the other hand, a HE device may acquire a transmission opportunity through a band including a secondary channel regardless of FIG. 19, FIG. 20, and FIG. 21. Therefore, in some embodiments, the BSS 800 may determine how the neighbor BSSs divide and use the bands.

In one embodiment, the response frame may include bandwidth information indicating band usage of the neighbor BSSs. The bandwidth information may be transferred through additional data subcarriers of the response frame.

In another embodiment, a signal field of a data frame may include the bandwidth information.

In yet another embodiment, the bandwidth information may include BSS information of a BSS that is permitted to use the unoccupied band. Accordingly, the neighbor BSS can use the unoccupied band if the BSS information included in the bandwidth information includes BSS information corresponding to the neighbor BSS. The BSS information may be an identifier (ID) of a BSS, i.e., a BSSID or a BSS color ID. The BSS color ID is an ID used for distinguishing neighbor BSSs and may have 3 bits. In yet another embodiment, the bandwidth information may further include information on a bandwidth which a BSS corresponding to the BSS information can use. Then, the neighbor BSS can use a band corresponding to its BSS information if the BSS information included in the bandwidth information includes its BSS information.

In some embodiments, a specific wireless communication network such as an enterprise network may allocate different secondary channel bands to the neighbor BSSs by performing scheduling in advance. When performing the scheduling, an AP may know available bands but stations may not know the available bands. In this case, the AP may notify of the available bands and a HE device receiving the notification may notify the neighbor BSS of the available bands. Two NAVs may be used to match an end time (for example, TXOP duration) of a transmission on a band used by the neighbor BSS to an end time (for example, TXOP duration) of a transmission in the BSS using the primary channel.

In some embodiments, a fractional frequency reuse scheme may be used. That is, an AP may perform a transmission to a device close to the AP by using the entire band with a low power, thereby increasing a data rate. The AP may use different bands for devices on the edge of the BSS, thereby preventing interferences from occurring between the devices on the edge.

It has been described above that the communication link of the unoccupied band including the secondary channel is established within the transmission duration of the communication link on the band including the primary channel. In some embodiments, the communication link of the unoccupied band may be established longer than the communication link on the band including the primary channel. In this case, after a transmission through the band including the primary channel is completed, a HE device may attempt a transmission through the band including the primary channel again. At this time, the HE device may determine whether the communication link on the band including the secondary channel exists through carrier sensing and then attempt to access the channel. As such, since the primary channel and the secondary channel may be simultaneously used, clear channel assessment (CCA) levels applied to the carrier sensing may be set to the same level in the primary channel and the secondary channel.

Figure 23:
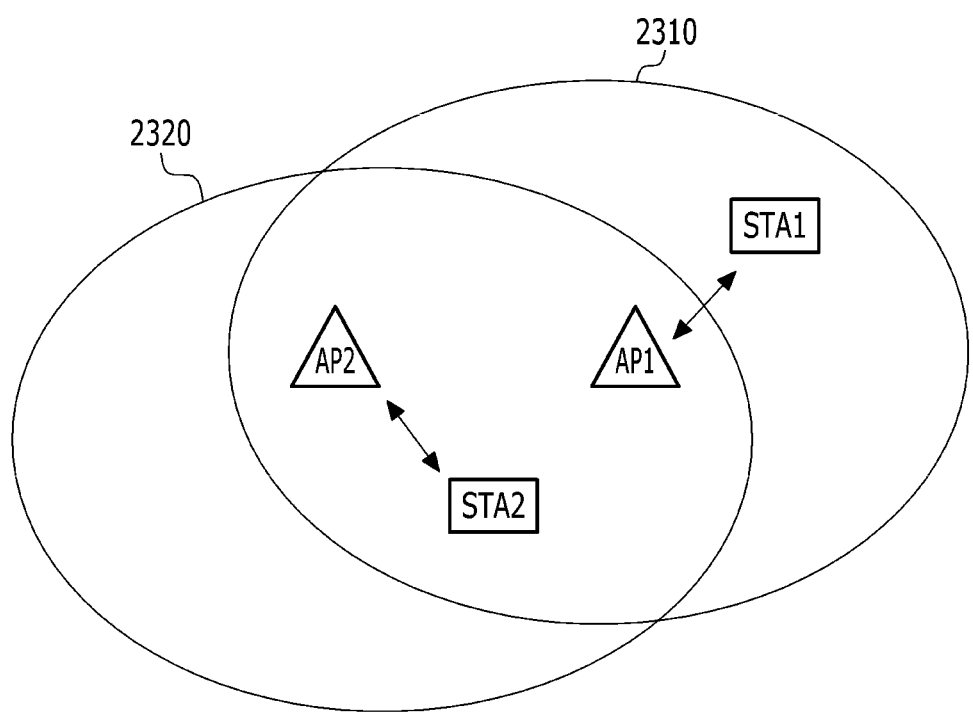
FIG. 23 shows yet another example of a wireless communication network according to an embodiment of the present invention.

FIG. 23 shows another example of a wireless communication network according to an embodiment of the present invention, and FIG. 24, FIG. 25, FIG. 26, and FIG. 27 shows various examples of channel reuse in a wireless communication network according to another embodiment of the present invention.

Referring to FIG. 23, in a neighbor BSS 2320 whose primary channel is different from a primary channel of a BSS 2310, a transmitting device, for example an AP AP2 and a receiving device, for example a station STA2 use a band including a primary channel (for example, a 40 MHz band CH2 and CH3 in the middle of an 80 MHz entire band). In this case, when a transmitting device, for example AP AP1, and a receiving device, for example a station STA2, attempt to establish a communication link in the BSS 2310, they cannot use the middle 40 MHz band CH2 and CH3 due to interference from an OBSS and can use only 20 MHz bands CH1 and CH4 of both ends. The transmitting device AP1 and the receiving device STA1 may be HE devices.

In this case, a previous version device of the BSS 2310 can use only a 20 MHz band corresponding to the primary channel CH1, but the HE device can use a 40 MHz band including the 20 MHz bands CH1 and CH4 of both ends.

Figure 24:
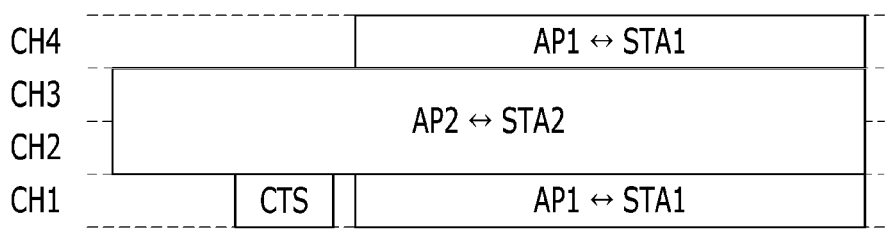
FIG. 24, FIG. 25, FIG. 26, and FIG. 27 shows various examples of channel reuse in a wireless communication network according to another embodiment of the present invention.
Figure 25:
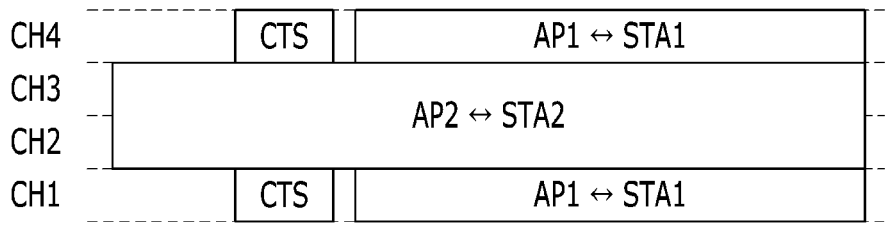

For this, when transmitting a response frame, for example a CTS frame, in response to a request frame, for example an RTS frame, from the transmitting device AP1, the receiving device STA1 according to one embodiment may transmit the response frame through the 20 MHz band of the primary channel CH1 as shown in FIG. 24. Bandwidth information included in the response frame may indicate the 20 MHz bands CH1 and CH4 of both ends. In another embodiment, as shown in FIG. 25, the receiving device STA1 may transmit the response frame through the available 20 MHz bands CH1 and CH4 of both ends. The bandwidth information included in the response frame may indicate the 20 MHz bands CH1 and CH4 of both ends.

The transmitting device AP1 transmits a data frame through the bands CH1 and CH4 that is indicated by the bandwidth information included in the response frame, and the receiving device STA1 transmits an ACK frame on the data frame through the same bands CH1 and CH4.

In some embodiments, a dynamic bandwidth indication set to a scrambler seed of a data field in the response frame may indicate the 20 MHz for a VHT device.

A previous version device sets a NAV according to the response frame transmitted through the primary channel and does not use the entire 80 MHz band. Accordingly, since the HE device can efficiently perform a transmission through the discontinuous bands without being disturbed by the previous version device, the frequency resource can be efficiently used.

Figure 26:
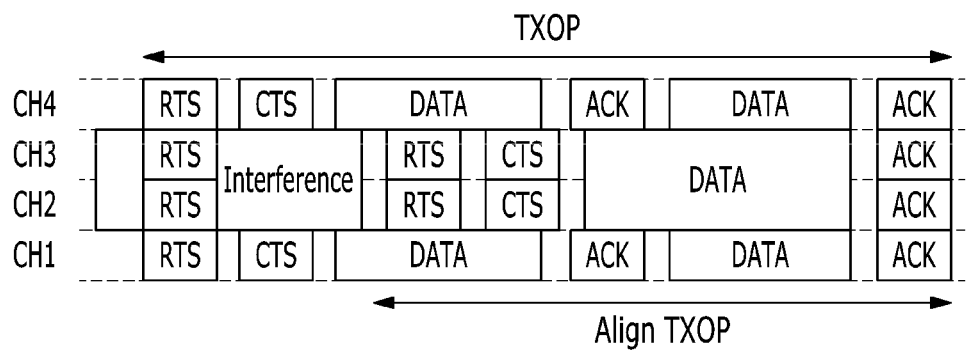

Referring to FIG. 26, while a transmitting device AP1 and a receiving device STA1 perform a transmission through discontinuous bands CH1 and CH4 in a BSS (2310 of FIG. 23), an interference from a neighbor BSS 2320 may be terminated. Then, other HE device (i.e., HE AP or HE station) may start a new transmission in the neighbor BSS 2320 or a new transmission may start between other HE devices (i.e., HE stations) in the BSS 2310, through a middle 40 MHz band CH2 and CH3.

In this case, the other HE device may identify an end time (for example, TXOP duration) of the transmission through the discontinuous bands between the transmitting device AP1 and the receiving device STA1, by interpreting a duration/ID field of a response frame or length information in a legacy signal field (L-SIG) of a data frame that is transmitted between the transmitting device AP1 and the receiving device STA1. Accordingly, the other HE device can match an end time (for example, TXOP duration) of the new transmission to the end time (for example, TXOP duration) of the transmission through the discontinuous bands between the transmitting device AP1 and the receiving device STA1.

Then, since the entire band can be used after the two transmissions are completed, a high speed transmission can be performed by using the entire band.

However, a previous version device of the neighbor BSS 2320 cannot interpret the response frame or the data frame of the BSS 2310 because the response frame or the data frame of the BSS 2310 is transmitted on the band that does not include its primary channel. Therefore, the previous version device of the neighbor BSS 2320 cannot match the end time (for example, TXOP duration) of the new transmission to the end time (for example, TXOP duration) of the transmission through the discontinuous bands in the BSS 2310.

Figure 27:
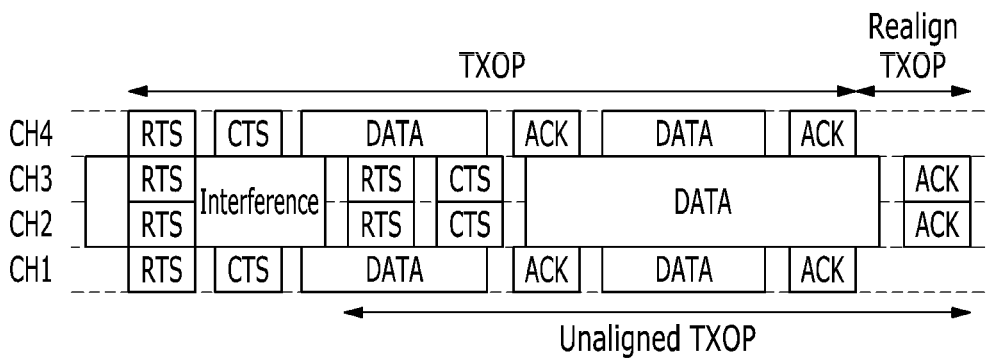

In some embodiments, as shown in FIG. 27, when transmitting a frame within TXOP duration again, a transmitting device AP1 or a receiving device STA1 of a BSS 2310 may align an end time (for example, the TXOP duration) of the transmission. For example, the transmitting device AP1 may identify an end time (for example, TXOP duration) of a new transmission, by interpreting a duration/ID field of a request or response frame or a legacy signal field (L-SIG) of a data frame which the previous version device transmits for the new transmission. The transmitting device AP1 can match an end time (for example, TXOP duration) of the transmission to the end time (for example, TXOP duration) of the new transmission in the neighbor BSS 2320.

A HE device may a plurality of NAVs to align TXOP duration. In one embodiment, the HE device may use a primary NAV and a secondary NAV as the plurality of NAVs. The primary NAV corresponds to a NAV that is initially set while a NAV has not been set previously. When the primary NAV is set on a part band not an entire band, a NAV that is used for a transmission through a band on which the primary NAV is not set is called a secondary NAV. Hereinafter, an operation of the primary NAV and the secondary NAV is described with reference to FIG. 28.

Figure 28:
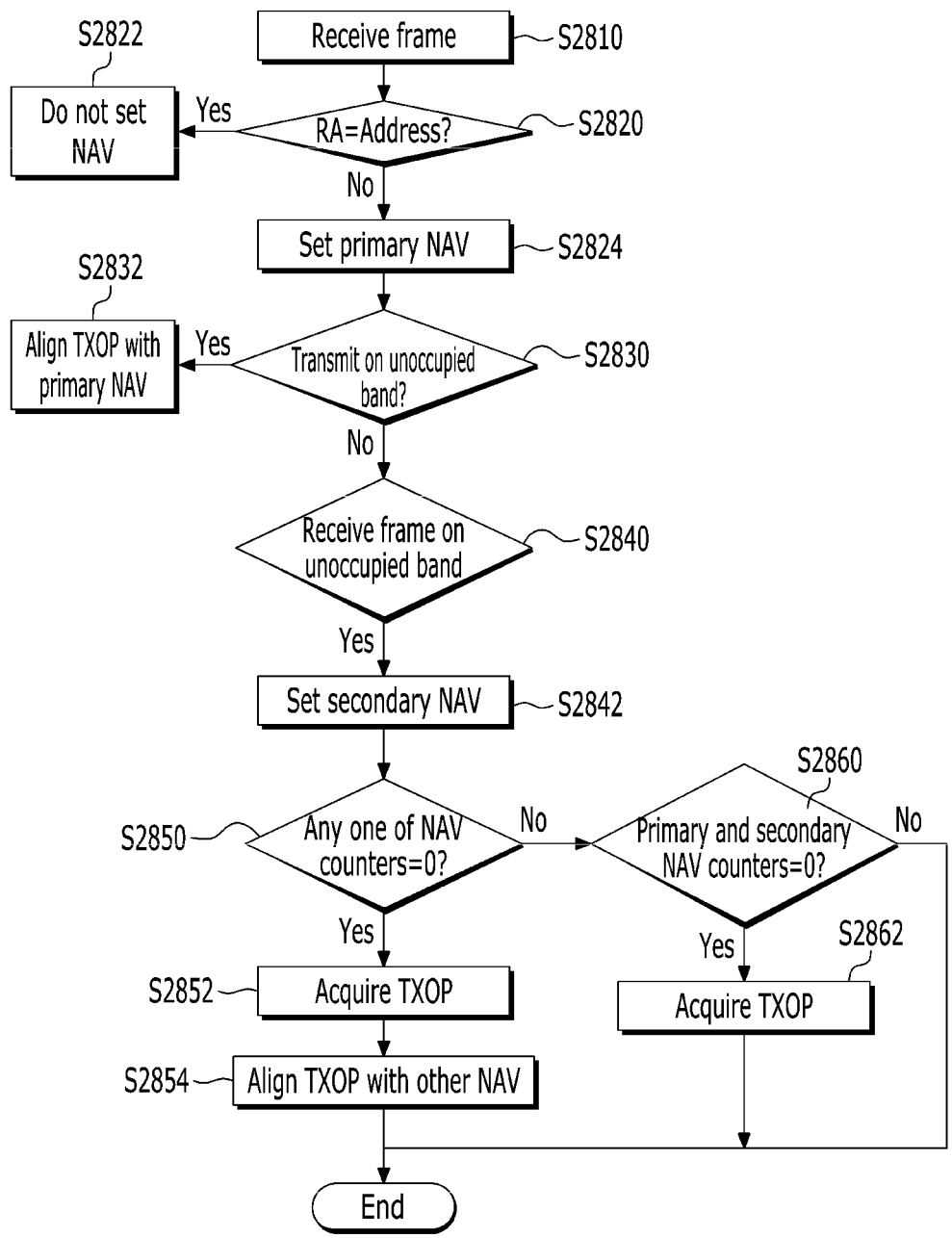
FIG. 28 is a flowchart showing an operation example of a primary NAV and a secondary NAV in a wireless communication network according to an embodiment of the present invention.

FIG. 28 is a flowchart showing an operation example of a primary NAV and a secondary NAV in a wireless communication network according to an embodiment of the present invention.

Referring to FIG. 28, when a HE device receives a frame (for example, a request frame or a response frame) including bandwidth information indicating that a part band is used not an entire band (S2810), the HE device determines whether a receiver address (RA) of the received frame matches its address (S2820). If the RA of the received frame matches its address, the HE device does not set a NAV (S2822) and performs an operation according to the received frame.

If the RA of the received frame does not match its address, the HE device set a primary NAV (S2824). That is, the HE device sets the primary NAV on a band indicated by the bandwidth information if a NAV has not been set previously. If the primary NAV has been already set on the band indicated by the bandwidth information, the HE device updates the primary NAV in accordance with a duration value when the duration value indicated by a duration/ID field of the received frame is longer than the primary NAV.

When the HE device performs a transmission on an occupied band (S2830) after setting the primary NAV (S2824), the HE device matches TXOP duration of the transmission through the unoccupied band to the primary NAV (S2832).

When the HE device receives on the occupied band a frame whose RA is not its address (S2840) after setting the primary NAV (S2824), the HE device set a secondary NAV (S2842). In some embodiments, the HE device may set the secondary NAV when the received frame includes bandwidth information and the bandwidth information indicates the unoccupied band. If the received frame does not include the bandwidth information, the HE device may not set the secondary NAV since the received frame is a frame transmitted by a previous version device.

If a NAV counter of any one of the primary NAV and the secondary NAV becomes zero (S2850) after the secondary NAV is set (S2842), a transmission can be performed through a band whose NAV counter becomes zero. Accordingly, the HE device acquires a transmission opportunity (S2852) if determining that the corresponding band is idle through carrier sensing, and matches TXOP duration of a transmission through the corresponding band to the other NAV (S2854).

If NAV counters of both the primary NAV and the secondary NAV become zero (S2860) after the secondary NAV is set (S2842), a transmission through the entire band can be performed. Accordingly, the HE device acquires a transmission opportunity through the idle band (S2862).

Figure 29:
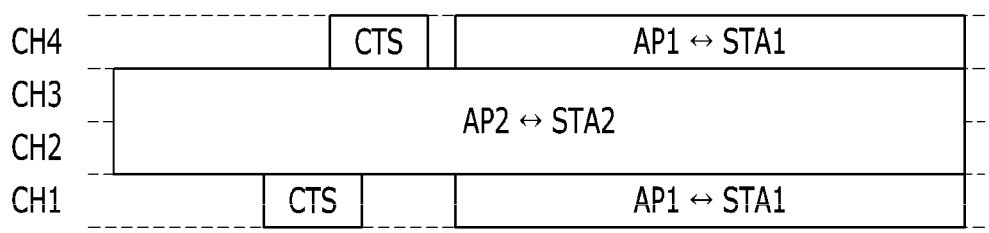
FIG. 29 and FIG. 30 show various examples of channel reuse in a wireless communication network according to another embodiment of the present invention.
Figure 30:
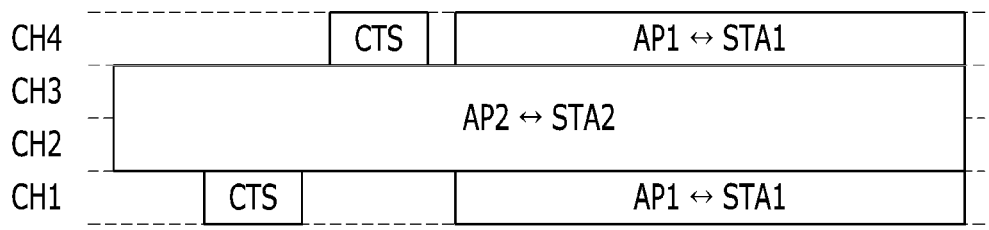

FIG. 29 and FIG. 30 show various examples of channel reuse in a wireless communication network according to another embodiment of the present invention.

In an embodiment described with reference to FIG. 25, when transmitting a response frame, for example a CTS frame, through discontinuous bands, a receiving device STA1 simultaneously transmits the response frames on the discontinuous bands.

Referring to FIG. 29 and FIG. 30, in some embodiment, the receiving device STA1 may sequentially transmit the response frame on the discontinuous bands at time intervals.

As shown in FIG. 29, an interval between the response frames may be shorter than a length of the response frame.

As shown in FIG. 30, the interval between the response frames may be equal to or longer than the length of the response frame.

A frame transmitting method and a frame receiving method according to above embodiments of the present invention may be executed by a baseband processor 10 shown in FIG. 1 to FIG. 3. In one embodiment, instructions for executing the frame transmitting method and the frame receiving method according to above embodiments of the present invention may be stored in a recording medium such as a memory 40. In another embodiment, at least some of the instructions may be MAC software. In yet another embodiment, at least some of the instructions may be transmitted from a recording medium of a certain server and may be stored in the memory 40.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of transmitting a frame by a first device in a wireless local area network, the method comprising:
receiving a second frame including bandwidth information of a second channel from a second device before transmitting a first frame, the second channel being selected from among a plurality of channels into which an entire channel width is divided;
transmitting the first frame including bandwidth information of a first channel directly to the second device, the first channel being selected from among the plurality of channels into which the entire channel width is divided and discontinuous channels capable of being selected as the first channel from among the plurality of channels; and
performing a direct communication with the second device through the first channel,
wherein a direct transmission is performed through a third channel between a third device and a fourth device when the direct communication with the second device through the first channel is performed, the third channel is determined by the third device using the bandwidth information included in the second frame and the bandwidth information included in the first frame, and the third channel is a part of the plurality of channels and the first and third channels have disjoint bandwidths, and
wherein each channel of the plurality of channels is a wireless channel, and
wherein the second channel has a bandwidth that includes the first channel and the third channel.

2. The method of claim 1, wherein receiving the second frame includes receiving the second frame on the plurality of channels.

3. The method of claim 1, wherein receiving the second frame includes receiving the second frame only on the second channel.

4. The method of claim 1, wherein transmitting the first frame includes transmitting the first frame on the plurality of channels.

5. The method of claim 1, wherein transmitting the first frame includes transmitting the first frame only on the first channel.

6. The method of claim 1, further comprising matching an end time of a transmission through the first channel to an end time of the direct transmission through the third channel.

7. The method of claim 1, further comprising, when the direct transmission through the third channel ends and a new transmission through the third channel starts while a transmission through the first channel is performed, aligning an end time of the transmission through the first channel to be matched to an end time of the new transmission through the third channel.

8. The method of claim 1, further comprising:
setting a first network allocation vector (NAV) by a transmission through the first channel at the third device after the direct communication with the second device is completed; and
setting a second NAV by a transmission through the third channel.

9. The method of claim 8, further comprising:
when any one of the first NAV and the second NAV is expired, acquiring a transmission opportunity (TXOP) through a channel of the expired NAV; and
aligning TXOP duration of a transmission through the channel of the expired NAV with TXOP duration of a channel of unexpired NAV.

10. The method of claim 1, wherein the first frame includes a legacy short training field, a legacy long training field, a legacy signal field, and a data field of a legacy frame format, and
wherein the bandwidth information is allocated to additional data subcarriers that are some of subcarriers which are not set as data subcarriers at the legacy frame format in at least one field of the legacy short training field, the legacy long training field, the legacy signal field and the data field.

11. The method of claim 10, wherein the at least one field includes the data field.

12. The method of claim 11, wherein the at least one field further includes the legacy signal field.

13. The method of claim 1, wherein the first and second devices are both associated with a first Basic Service Set (BSS) and the third and fourth devices are both associated with a second BSS different from the first BSS.

14. The method of claim 1, wherein the first, second, third, and fourth devices are all associated with a same Basic Service Set (BSS).

15. A method of receiving a frame by a first device in a wireless local area network, the method comprising:
transmitting a second frame including bandwidth information of a second channel to a second device before receiving a first frame;
receiving the first frame including bandwidth information of a first channel directly from the second device, the first channel being selected from among a plurality of channels into which an entire channel width is divided and discontinuous channels capable of being selected as the first channel from among the plurality of channels; and
performing a direct communication with the second device through the first channel,
wherein a direct transmission is performed through a third channel between a third device and a fourth device when the direct communication with the second device through the first channel is performed, the third channel is a part of the plurality of channels and does not include the first channel, the third channel is determined by the third device using the bandwidth information included in the second frame and the bandwidth information included in the first frame, and the first and third channels have disjoint bandwidths, and
wherein each channel of the plurality of channels is a wireless channel, and
wherein the second channel has a bandwidth that includes the first channel and the third channel.

16. The method of claim 15, wherein transmitting the second frame includes transmitting the second frame on the plurality of channels.

17. The method of claim 15, wherein transmitting the second frame includes transmitting the second frame only on the second channel.

18. The method of claim 15, wherein receiving the first frame includes receiving the first frame on the plurality of channels.

19. The method of claim 15, wherein receiving the first frame includes receiving the first frame only on the first channel.

20. The method of claim 15, wherein the first, second, third, and fourth devices are all associated with a same Basic Service Set (BSS).

* * * * *